Sept. 11, 1956 J. L. HITTELL Re. 24,214

INTERNAL COMBUSTION ENGINE

Original Filed March 7, 1946 15 Sheets-Sheet 1

INVENTOR
John L. Hittell

INTERNAL COMBUSTION ENGINE

Original Filed March 7, 1946 15 Sheets-Sheet 2

INVENTOR
John L. Hittell

INTERNAL COMBUSTION ENGINE

Original Filed March 7, 1946 15 Sheets-Sheet 3

INVENTOR.

John L. Hittell

INVENTOR.

John L. Hittell

INTERNAL COMBUSTION ENGINE

Original Filed March 7, 1946 15 Sheets-Sheet 5

INVENTOR.

John L. Hittell

INTERNAL COMBUSTION ENGINE

Original Filed March 7, 1946 15 Sheets-Sheet 6

INVENTOR.
John L. Hittell

INTERNAL COMBUSTION ENGINE

Original Filed March 7, 1946 15 Sheets-Sheet 7

INVENTOR
John L. Hittell

INTERNAL COMBUSTION ENGINE

Original Filed March 7, 1946 15 Sheets-Sheet 8

INVENTOR
John L. Hittell

INTERNAL COMBUSTION ENGINE

Original Filed March 7, 1946 15 Sheets-Sheet 9

INVENTOR
John L. Hittell

INTERNAL COMBUSTION ENGINE

Original Filed March 7, 1946 15 Sheets-Sheet 10

INVENTOR.
John L. Hittell.

INVENTOR
John L. Hittell

INTERNAL COMBUSTION ENGINE

Original Filed March 7, 1946 15 Sheets-Sheet 12

INVENTOR
John L. Hittell.

INTERNAL COMBUSTION ENGINE

Original Filed March 7, 1946 15 Sheets-Sheet 13

INVENTOR
John L. Hittell

INVENTOR
John L. Hittell

INTERNAL COMBUSTION ENGINE

Original Filed March 7, 1946 15 Sheets-Sheet 15

INVENTOR
John L. Hittell

United States Patent Office

Re. 24,214
Reissued Sept. 11, 1956

24,214

INTERNAL COMBUSTION ENGINE

John L. Hittell, Livonia, Mich.

Original No. 2,644,021, dated June 30, 1953, Serial No. 652,678, March 7, 1946. Application for reissue December 9, 1954, Serial No. 474,310

31 Claims. (Cl. 123—48)

Matter enclosed in heavy brackets [ ] appears in the original patent but forms no part of this reissue specification; matter printed in italics indicates the additions made by reissue.

This invention pertains particularly to structures cooperating to improve efficiency, durability and adaptability of [such] *internal combustion* engines by providing means for successful operation at variable displacement, and for improved compression ignition operation.

One object of this invention is to provide automatic means for controlling the variable displacement of the engine and to have this means operate in accordance with the amount of power the engine is being called upon to produce by the combined action of the operator's control of the throttle and the load on the engine.

It is a further object to provide speed limiting control devices capable of limiting the engine speed to a certain value at full displacement but allowing increase of this speed in accordance with increase safe operating speed at reduced displacement and speed responsive means for advancing injection timing as the engine speed is increased and to provide an engine with novel valve mechanism capable of satisfactory and enduring operation at ultra high speeds when operating the engine at reduced displacement.

Another object of this invention is to provide improved means of fuel injection capable of maintaining an ultra fine degree of atomization even at cranking speeds and also capable of metering the fuel injected per cylinder stroke in more exact proportion to the weight of air taken into the cylinder under wide variations of operating conditions.

A further important object of this invention is to provide means for maintaining consistent accuracy of fuel metering under variations of fuel viscosity and wear of parts by completely eliminating leakage through sliding or running fits as a factor affecting fuel metering, and further to avoid likelihood of the fuel becoming mixed with lubricating oil by avoiding any reliance on the ability of any rotating or sliding fit to keep the fuel and lubricating oil separated. These two features avoid the need of ultra-fine fits heretofore found to be absolutely necessary in high pressure fuel injection equipment and usually a cause of high manufacturing costs and considerable service trouble on account of sticking due to microscopic dirt particles, thermal expansion, surface growth or even slight gum or lacquer formation, or leaking beyond a tolerable amount due to even very slight wear.

Other objects are to provide fuel injection means unusually free from external piping and high pressure joints, to provide short lines free from harmful resonant conditions even at ultra-high operating speeds, and to provide for removal of injectors for test or replacement without disturbing any piping.

A further object of this invention is to widen the range of fuels which can be used with full satisfaction in a compression ignition engine by providing an injection system able to properly meter and atomize fuels of widely differing distilling ranges, even as light as gasoline, and to handle fuels of low ignition quality by operating at high compression pressures and temperatures and by maintaining fine fuel atomization under all operating conditions, especially at cranking speeds.

A more general object of this invention is to provide numerous new features contributing greatly to overall performance, long life and easy servicing of internal combustion engines and to devise and combine same in such compact, light weight and economical-to-manufacture form and arrangement that the savings thus accrued make possible the inclusion of these numerous improved features without increase in cost.

Further objects of this invention are such as may be attained by utilization of the various combinations, subcombinations, and principles hereinafter set forth in the various relations to which they may be adapted without departing from the spirit of my invention, as set forth more particularly in the following detailed disclosure of the preferred embodiments and in the terms of the appended claims.

Referring to the drawings.

Figure 14:
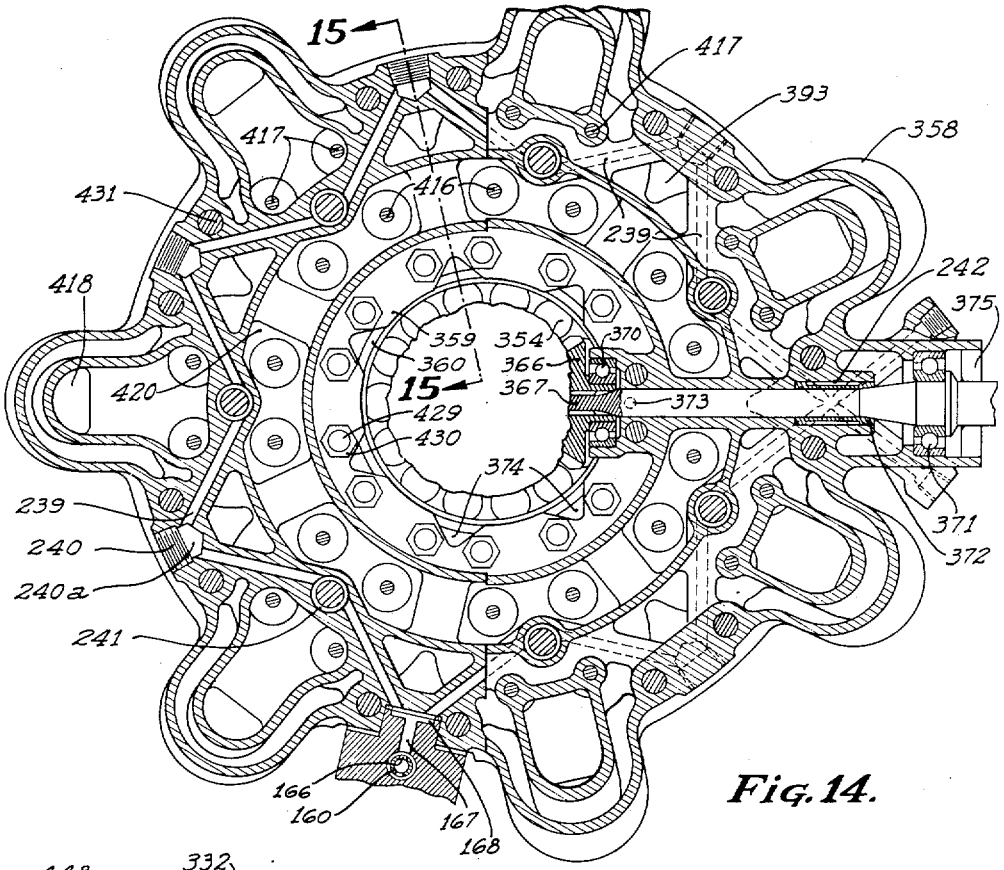
Fig. 14 is a stepped horizontal section through the engine head along line 14—14 of Fig. 2.
Figure 15:
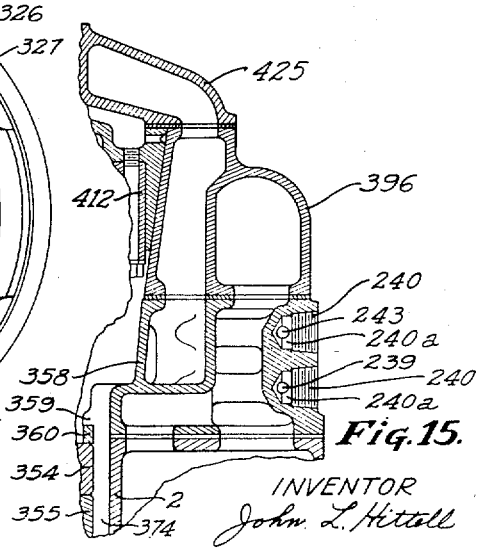

Fig. 15 is a vertical partial section through the engine head along a radial line 15—15 shown in Fig. 14. This is a typical section repeated in most respects in 6 other corresponding positions. The variations involved are shown in other views, particularly in Figs. 1, 2, 9, and 14.

Figure 2:
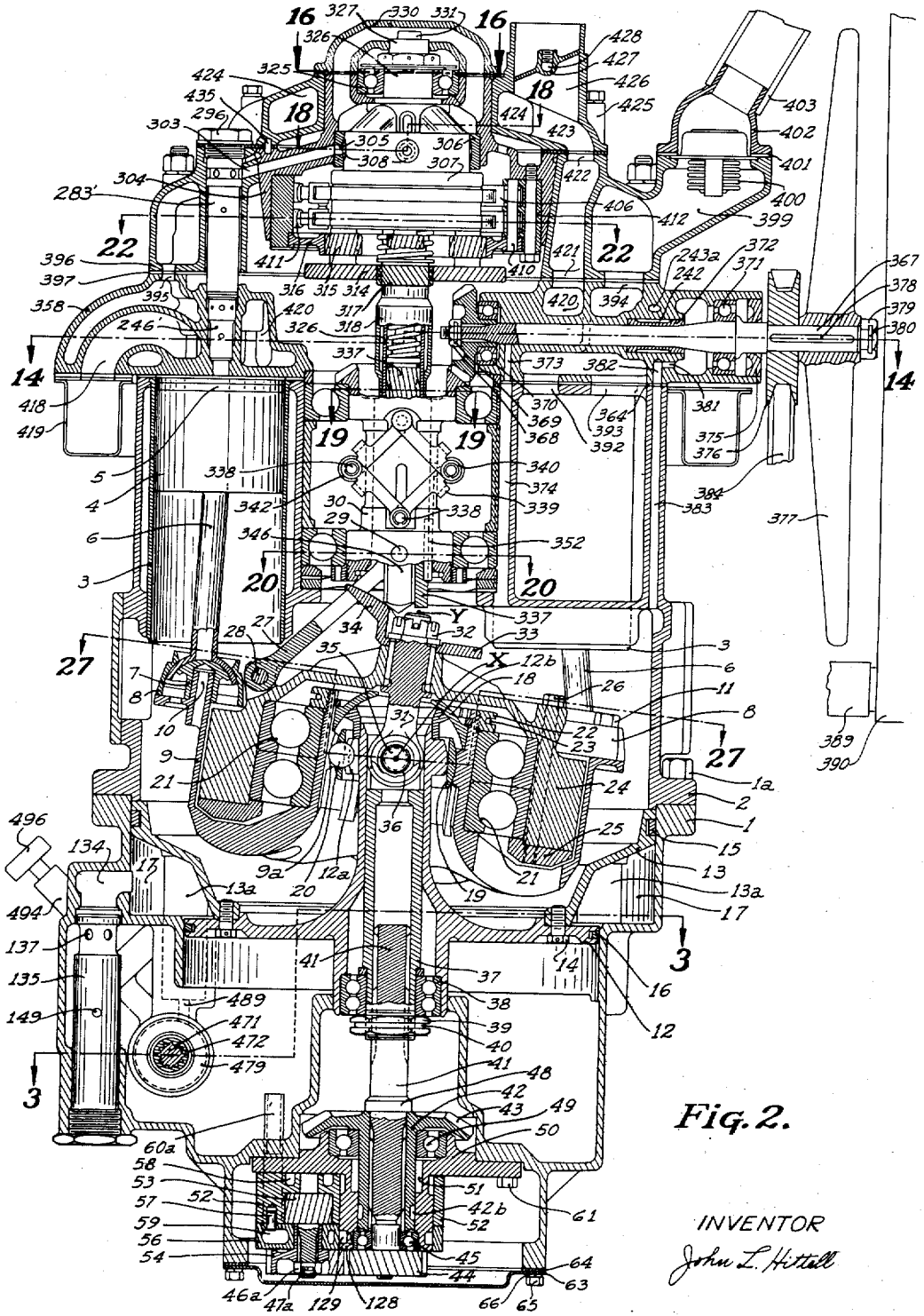
Fig. 2 is a vertical section through the complete unit along line 2—2 of Fig. 1. Certain parts having the interior detail too fine to show clearly in this figure are shown in exterior view and shown in detail sections to a larger scale in other figures.
Figure 16:
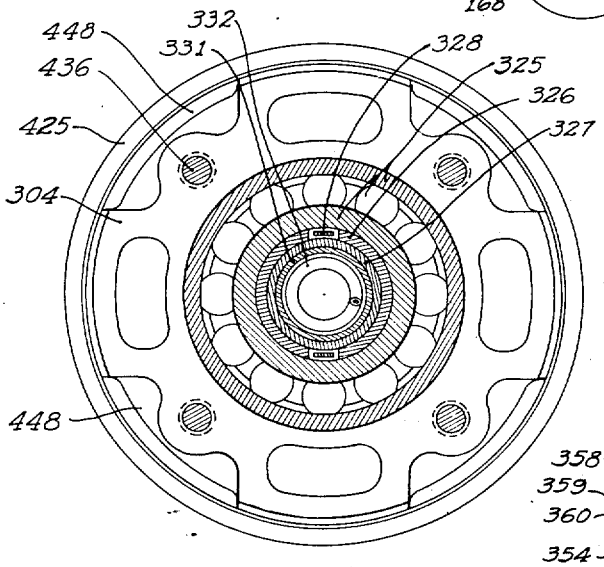

Fig. 16 is a horizontal section through the top portion of the engine along line 16—16 of Fig. 2.

Figure 1:
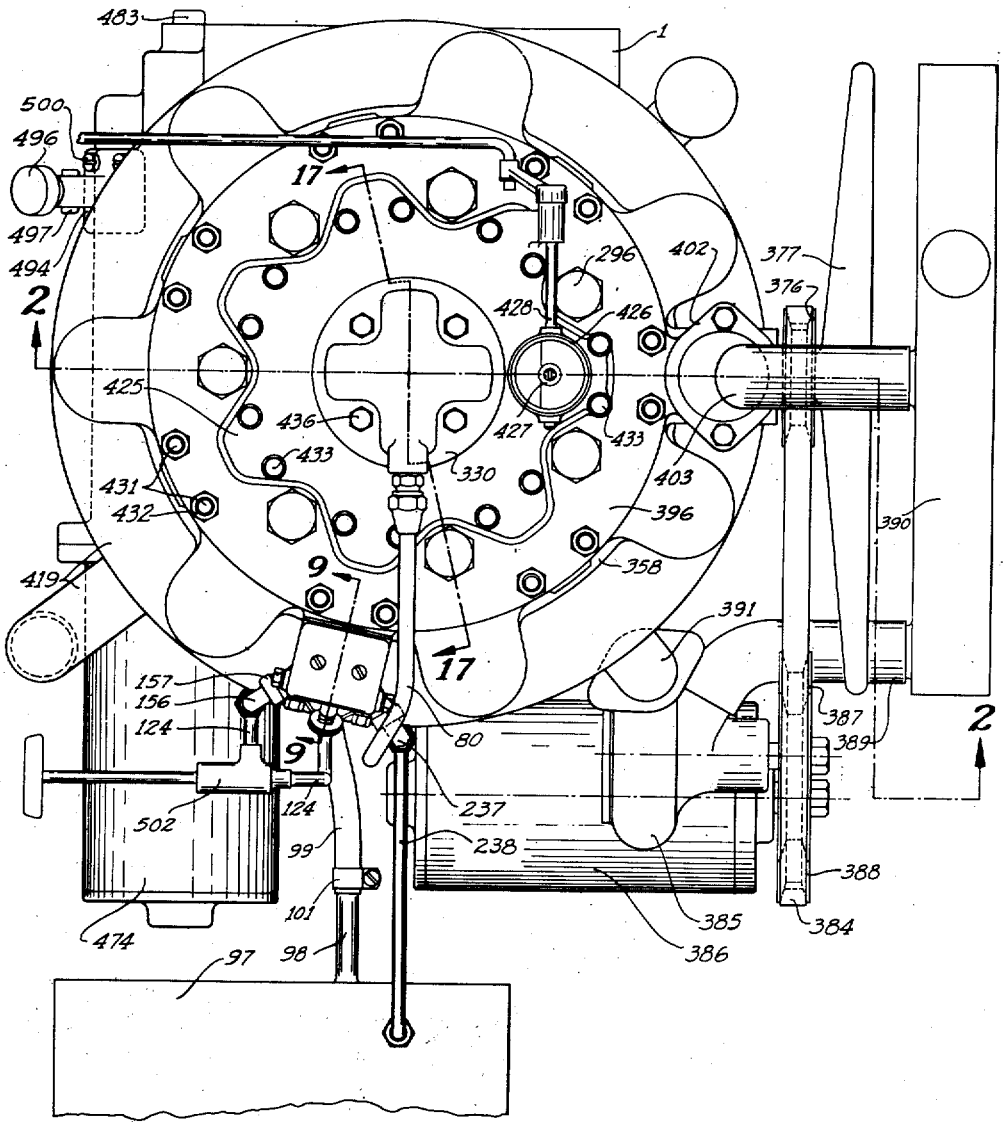
Fig. 1 is an exterior plan view of the engine showing also, somewhat diagrammatically, the principal accessories.
Figure 17:
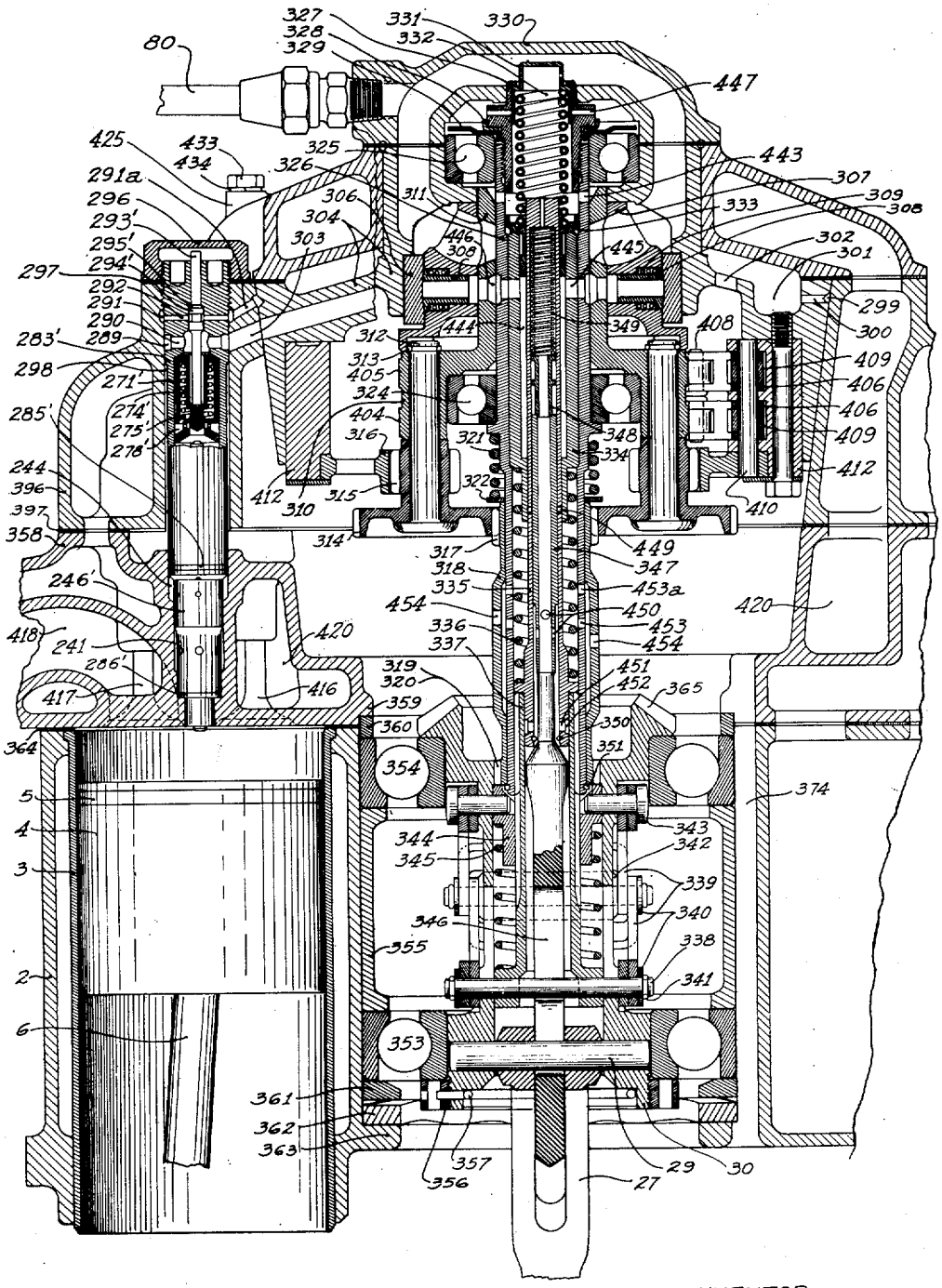

Fig. 17 is an enlarged partial vertical section substantially along line 17—17 of Fig. 1. The governor mechanism is here seen cut at a right angle to the way it is shown in Fig. 2.

Figure 18:
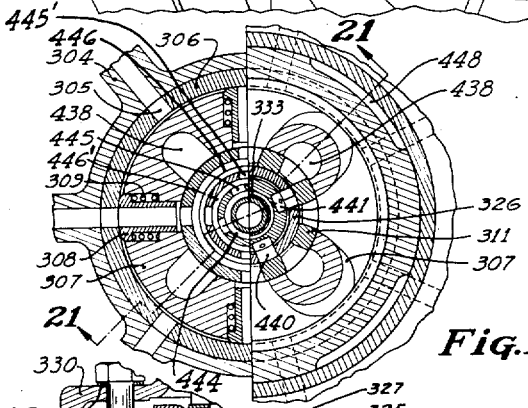

Fig. 18 is a partial horizontal section showing detail along line 18—18 of Fig. 2.

Figure 19:
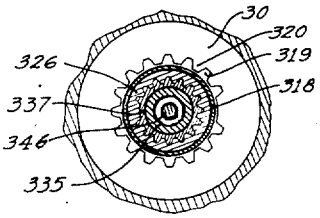

Fig. 19 is also a partial horizontal section showing detail along line 19—19 of Fig. 2.

Figure 20:
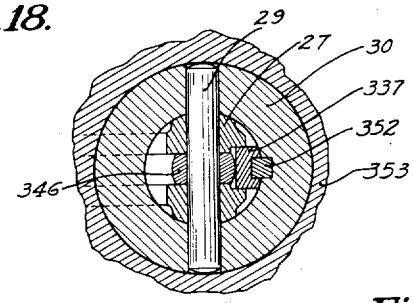

Fig. 20 is a partial horizontal section along line 20—20 of Fig. 2.

Figure 21:
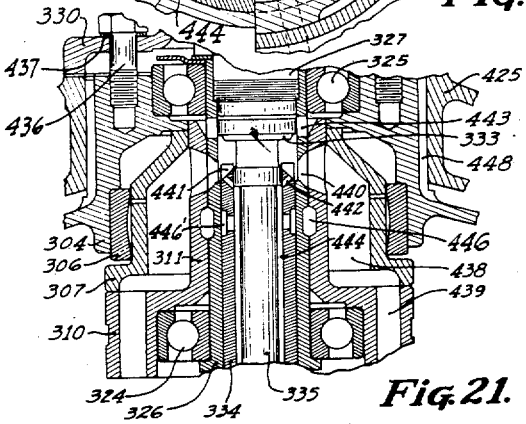

Fig. 21 is a partial vertical section taken on a plane at substantially forty-five degrees to the plane of Fig. 2 along line 21—21 of Fig. 18.

Figure 22:
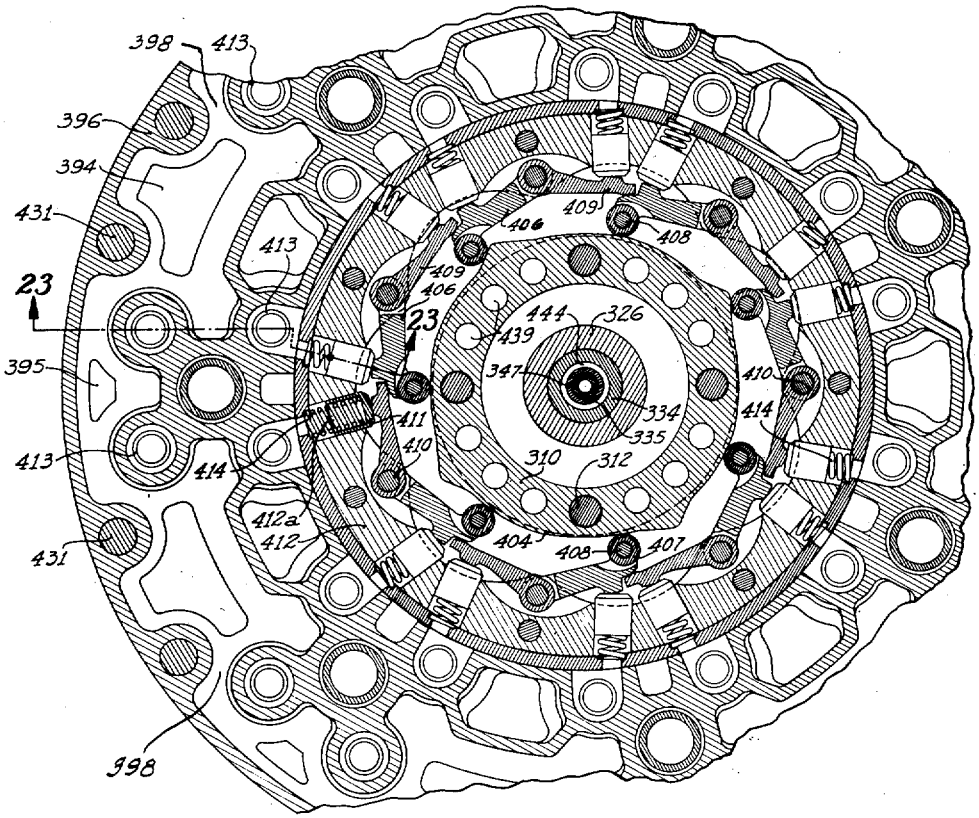

Fig. 22 is a partial horizontal section along line 22—22 of Fig. 2.

Figure 23:
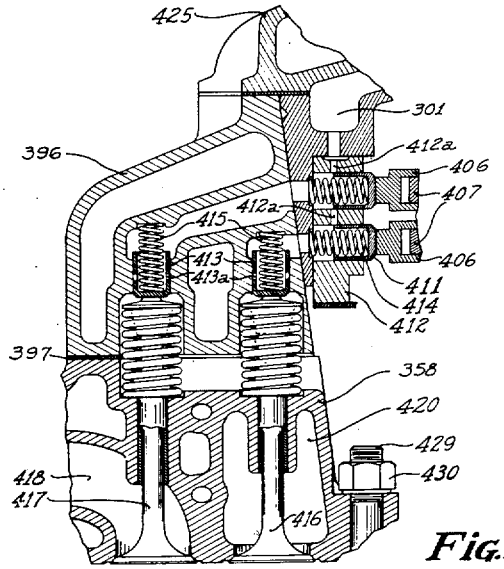

Fig. 23 is a section through valves and valve mechanism along line 23—23 of Fig. 22.

Figure 24:
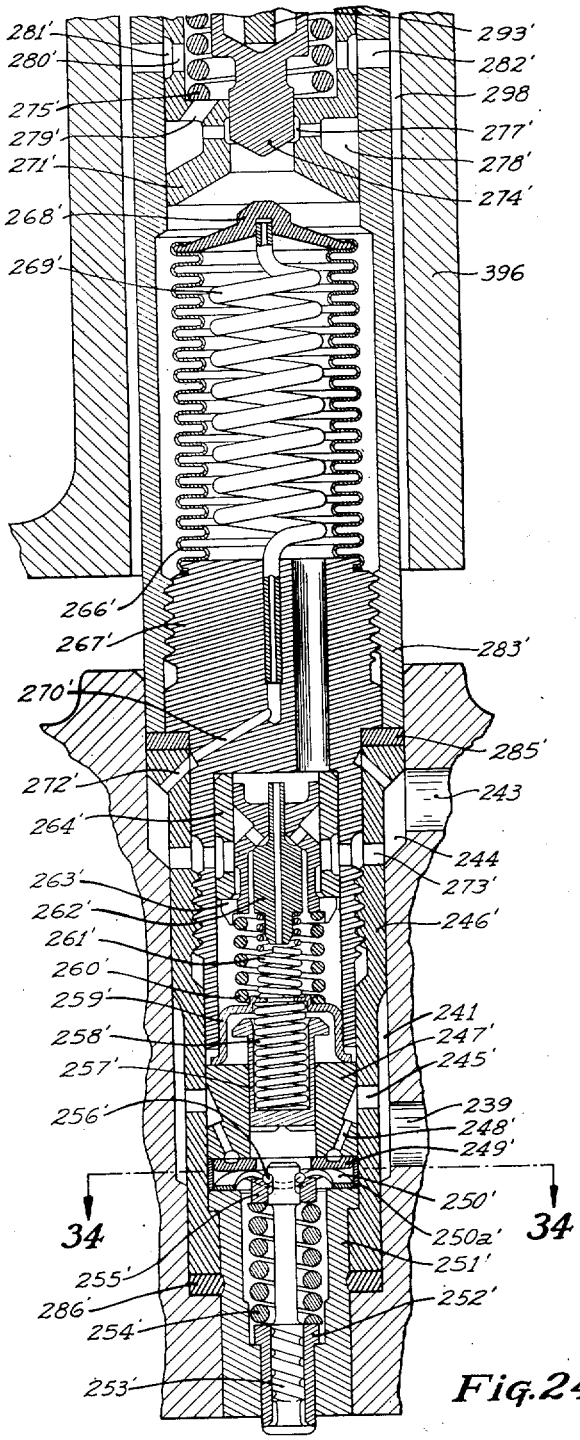

Fig. 24 is a much enlarged partial section through the centerline of the injector showing detail omitted from Figs. 2 and 17.

Figure 25:
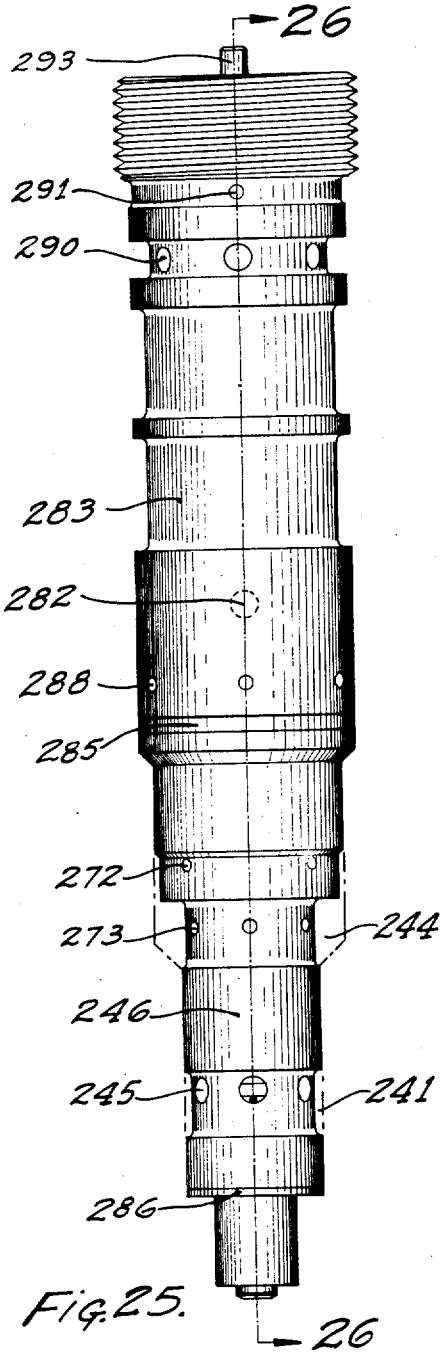

Fig. 25 is a view of a modified form of injector and injector shell.

Figure 26:
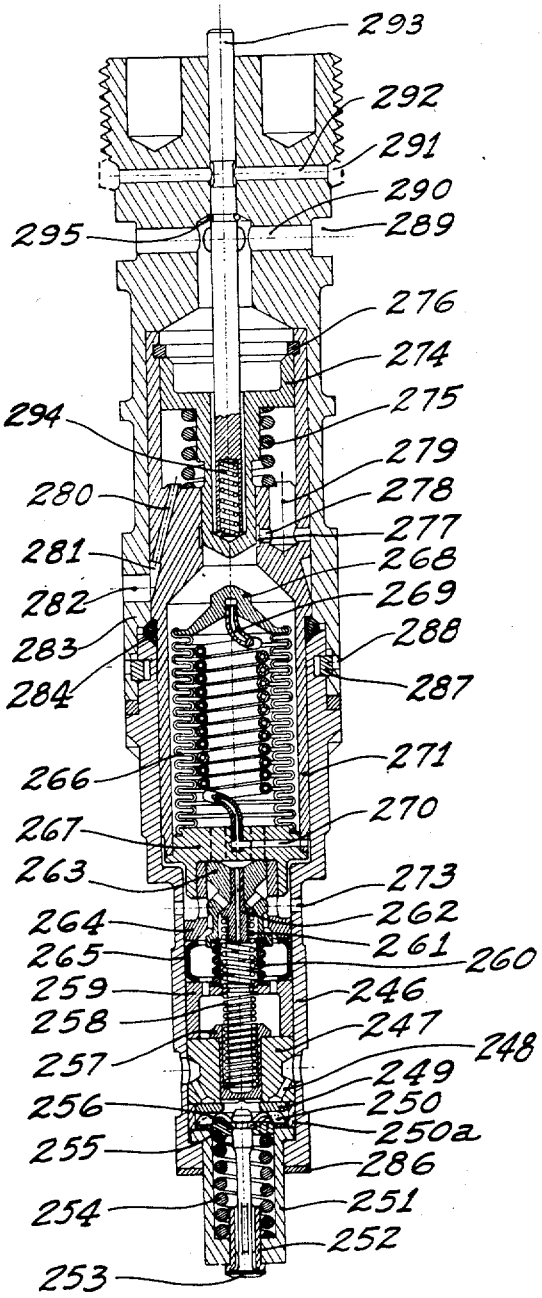

Fig. 26 is a sectional view through centerline of same as indicated by line 26—26 of Fig. 25.

Figure 27:
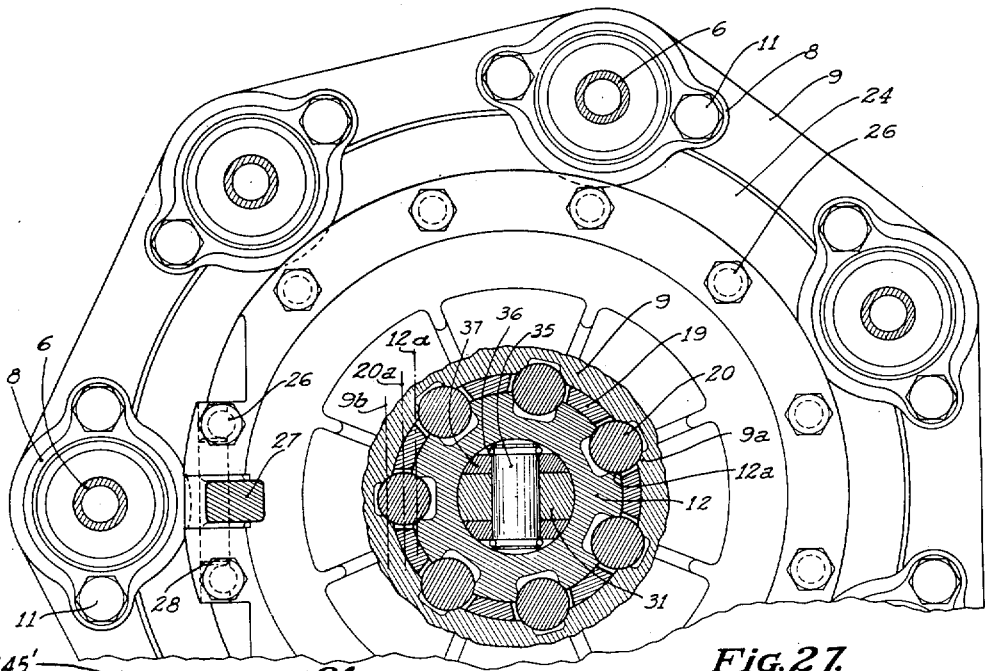

Fig. 27 is a partial view and section along line 27—27 of Fig. 2.

Figure 28:
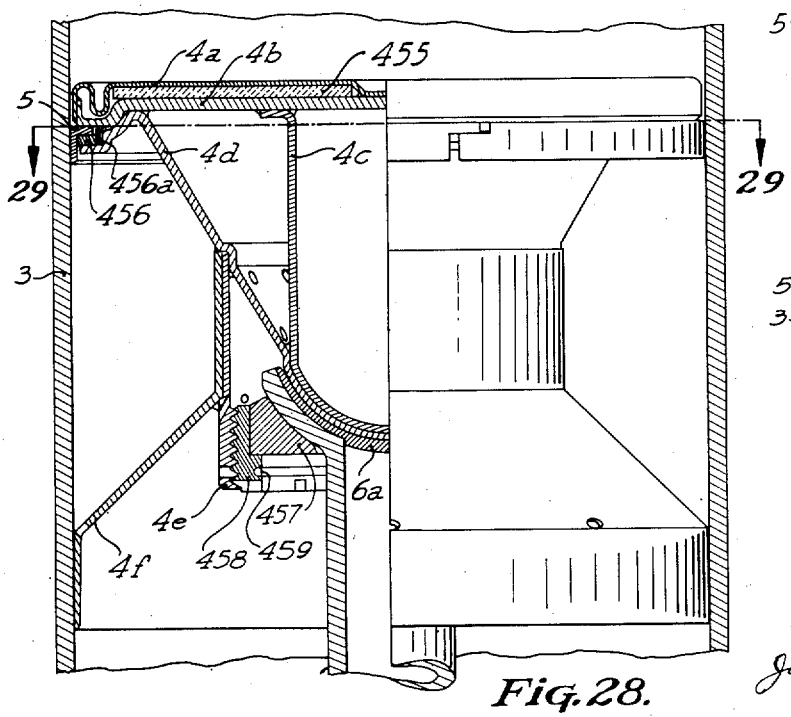

Fig. 28 is an enlarged partial section along line 2—2 of Fig. 1 showing details of rings, and upper connecting rod end ball joints, and showing also a modified form of piston particularly suited to this engine.

Figure 29:
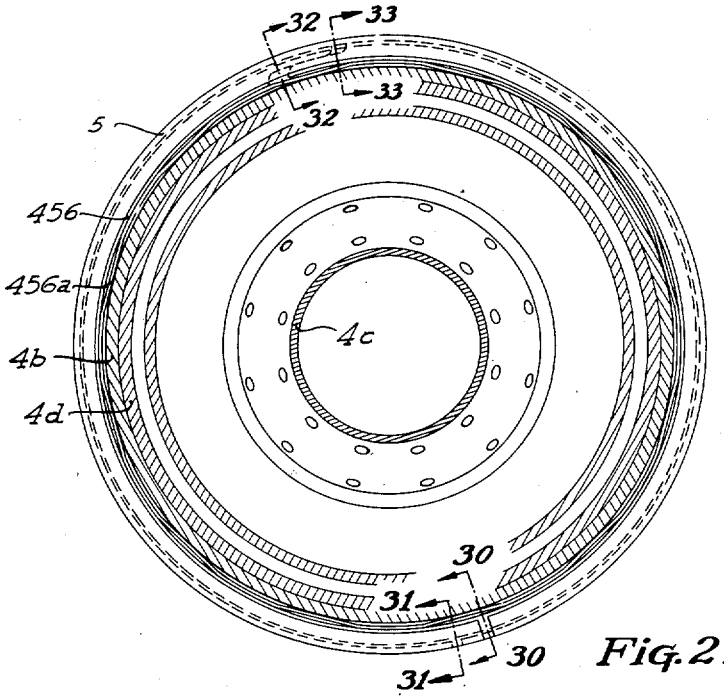

Fig. 29 shows a section along line 29—29 of Fig. 28.

Figs. 30, 31, 32, and 33 show further enlarged sections along lines indicated by corresponding numbers in Fig. 29.

Figure 34:
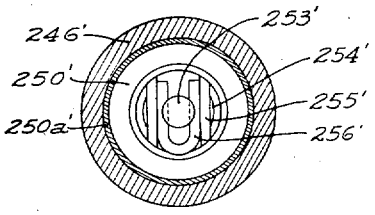

Fig. 34 is a section through the injector shown in Fig. 24 along line 34—34 of Fig. 24.

Figures 8, 35:
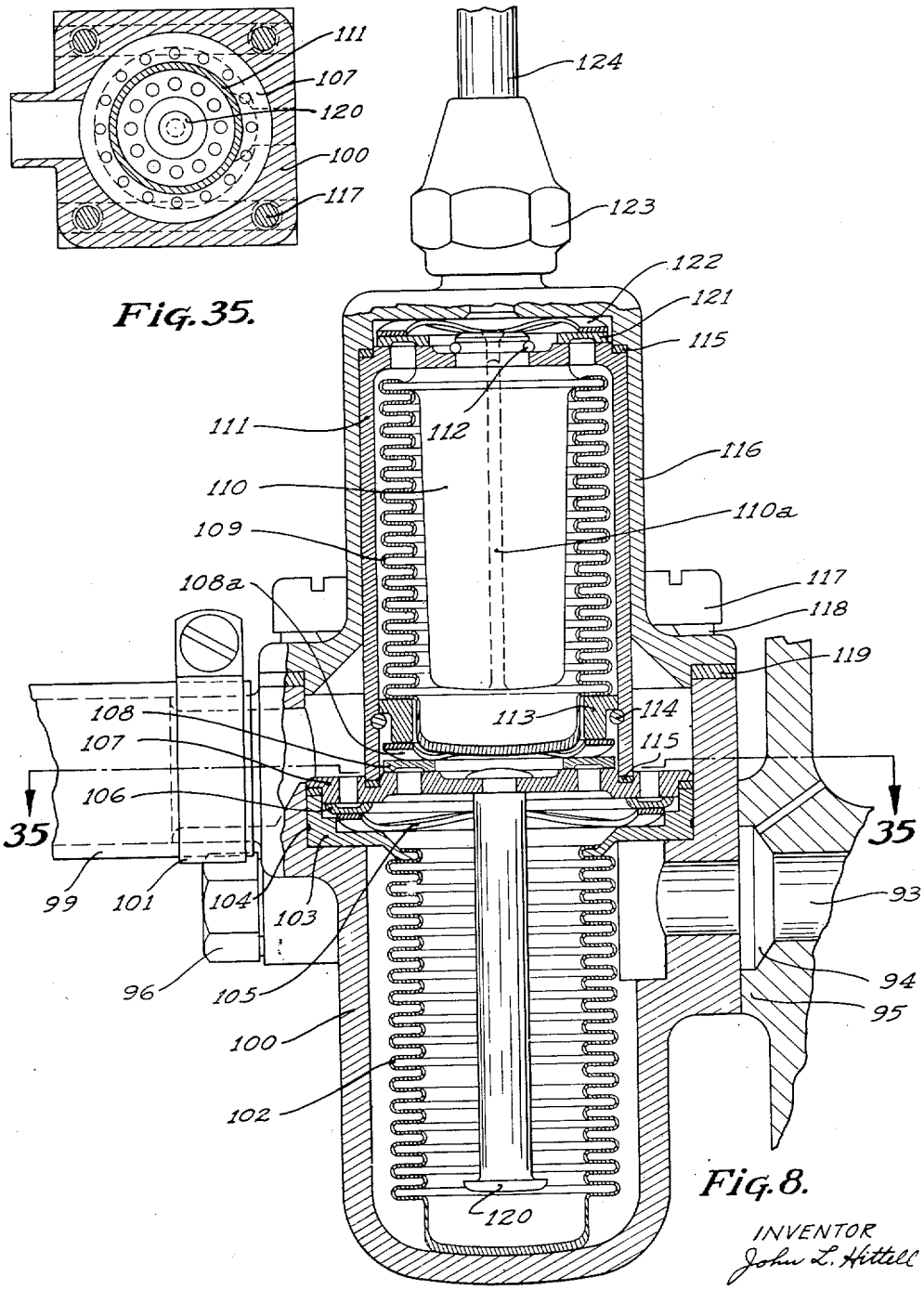
Fig. 8 is an enlarged vertical center line section through the fuel pump along line 8—8 of Fig. 3.
Figure 12:
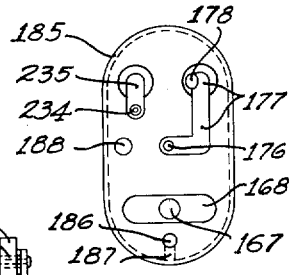
Fig. 12 is an end view of the extending portion of the fuel control box viewed as indicated by the line 12—12 of Fig. 9.
Figure 13:
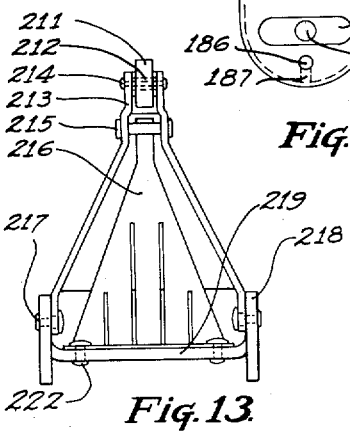
Fig. 13 is a view of some of the fuel box parts removed from the rest of the mechanism.
Figure 10:
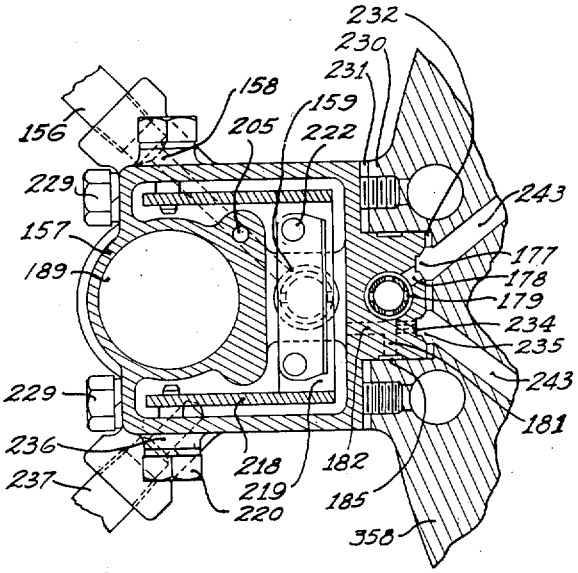
Fig. 10 is a horizontal section through fuel control box substantially along line 10—10 of Fig. 9.
Figure 11:
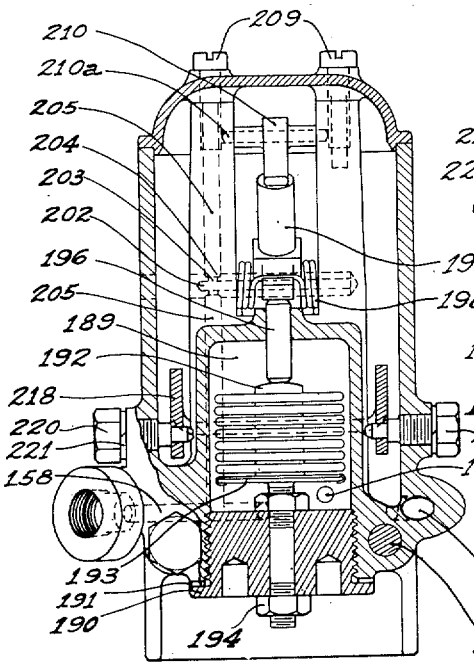
Fig. 11 is a vertical section through the fuel control box along line 11—11 of Fig. 9.
Figure 9:
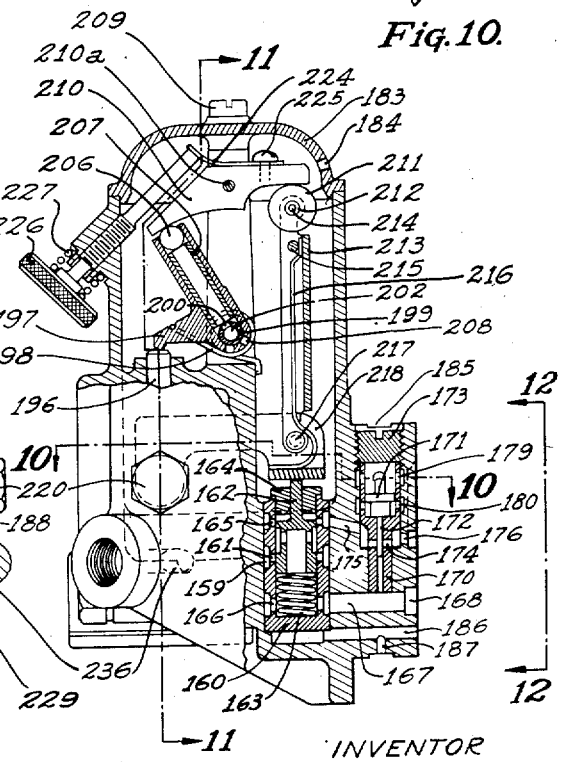
Fig. 9 is a vertical center line section through the fuel control box along the radial line 9—9 of Fig. 1.

Fig. 35 is a partial section along line 35—35 of Fig. 8.

While various important novel features of this invention can be usefully applied to engines of any known form or arrangement, an engine embodying all of the features of this invention in combination takes the form of a four-cycle compression ignition engine with a central shaft, preferably vertically disposed or substantially so, and with an odd number of cylinders arranged in a circle about the main axis and approximately parallel thereto.

Such an engine in small sizes may preferably be embodied in three cylinder form, while for engines of intermediate sizes such as are commonly used in self propelled road vehicles a seven cylinder construction is preferred and selected for illustration in this preferred embodiment, while for other uses five or nine or more cylinders might be more suitable.

In the seven cylinder engine herein described in detail and shown in the drawings, a base casting 1 serves as a general framework and housing in or upon which most of the apparatus is mounted. Referring initially to Fig. 2, an engine cylinder block 2 is mounted on the base 1 and retained thereon by cap screws 1a. The cylinder block carries liners 3 suitably fitted in the block at the top and bottom. Pistons 4 reciprocate in these liners and carry rings 5 for sealing the compression and firing pressures.

Tubular connecting rods 6 each have two cupped ends accurately finished inside and out to form concentric spherical surfaces. The lower end of each rod rests on a pressure block 7 and is held by retainer 8. The retainers and pressure blocks each have spherically finished surfaces mating with the spherical surfaces of the rod end to form a spherical bearing permitting the rod to swing to a limited angle in any direction. The blocks 7 rest on the upper plane surface of a rocking member 9 and are held against shifting by means of integral tubular extensions 10 projecting upward from the plane surface of member 9. The retainers 8 also rest on the plane surface of rocking member 9, and are held thereto by bolts 11. A similar type of joint at the upper end of the rod allows same to also swing at limited angles to the axis of the piston in any direction.

A displacement control member 12 is slidably fitted in a large bore in base casting 1 and has a smaller diameter portion extending downward into and also slidably fitting in a smaller bore in this casting. An annular piston

13 is affixed to the displacement control member by cap screws 14 and is slidably fitted in a larger bore in casting 1 and sealed by a ring 15. A ring 16 also seals the large diameter portion of control member 12 to complete the sealing of an annular chamber 17. When oil under pressure is admitted to chamber 17 it thus tends to raise the control member toward its uppermost position, in which it is shown.

Formed integrally with the upper end of the control member 12 is the inner member of an improved type of constant angular velocity universal joint. A number of ball races 12a are formed in the periphery of this portion with lands between these races forming partial spherical surfaces concentric with the point X and also with the main vertical axis. A thrust and centering member 12b is snugly fitted to the extreme upper end of member 12 and has a spherical surface, bearing against a concave spherical washer 18. A ball retainer and aligner 19 has an internal cylindrical surface in rocking contact with a portion of the lands between the said races 12a and a concentric exterior spherical surface in rocking contact with the central portion of the rocking member 9 which also has formed therein internal races 9a for the balls 20. This forms a constant angular velocity universal joint of a general type that is known, but I have devised certain improvements which will be more fully described hereinafter.

It is evident that a geometrically correct constant angular velocity universal joint in this environment serves to permit the rocking member 9 to rock about point X either fore and aft or left and right or any combination thereof without disturbing in the slightest way the angular position of the rocking member 9 about its axis along the line X—Y. The control member 12 and piston 13 are prevented from being rotated by torque reaction by three extensions 13a on piston 13 which register with three bores in casting 1.

Two annular contact ball bearings 21 are mounted on the inner portion of rocking member 9 and retained by nut 22 and lock wire 23, and a flywheel 24 is mounted on the outer races of these ball bearings, and retained in position thereon by cap ring 25 and bolts 26. One end of a link 27 is hinged to flywheel 24 by means of a pin 28 and a pin 29 through the other end of the link and through a shaft 30 hinges the upper end of the link to the shaft 30 on an axis intersecting the axis of the shaft. The flywheel 24 has an internally splined hub mating with an externally splined portion of a shaft 31 and is held in position thereon by a nut 32 which also retains a washer 33 which carries short splines to mesh with those on shaft 31 to hold this washer against turning so that an integral cam portion 34 is held in proper position to enter a slot provided in the link 27. The splines on flywheel 24 and shaft 31 also permit a pin 35, which is fitted in the lower end of the shaft 31 and the upper end of a power take-off quill shaft 37 and retained by lock rings 36, to be held parallel with pins 28 and 29.

It may now be noted that this construction permits the flywheel 24, the link 27, and the shafts 30, 31, and 37 to all rotate as a unit about the axis of shafts 30 and 37, carrying with them, of course, all the directly attached parts. This rotation carries the outer races of the ball bearings 21 in rotation about the main axis also, and since these ball bearings are at an angle, with the high point aligned with the link 27, the rocking member 9 is forced to rock about the point X as the above described parts rotate, with the result that rocking member 9 has its high edge follow around with rotation of the low end of link 27, but does not rotate at all, being held from rotation or even small angular oscillation about its axis X—Y by the balls 20 and their cooperating races. Accompanying this motion of rocking member 9 and pistons reciprocate in the cylinder liners 3 an amount that is governed primarily by the radius of the lower spherical center lines of the connecting rods 6 from the axis X—Y and by the angle of tilt of the bearings 21.

It now becomes evident that if the point X is lowered, keeping the center line of pin 29 at the same level, the angle of tilt of the bearings 21 is increased, and thus as point X is lowered the stroke of the pistons is thereby increased.

It might at first appear that lowering of point X would caust the upper limit of the stroke to be raised while the lower limit is being lowered, but this is not the case, since as point X is lowered the center line of pin 28 is also lowered to a lesser degree with the result that the top point of the stroke is made to lower slightly as the bottom point is lowered to its maximum stroke point.

By proper positioning of the pins 28 and 29 in relation to the high and low positions of pin 35, accompanied of course, by suitable length of link 27 and of connecting rods and pistons in relation to piston head clearance, it is possible to hold a compression ratio of 15 to 1 at full displacement and at two-thirds of full displacement and then to have the compression ratio increase to approximately 16 to 1 at one-half displacement and to approximately 20 to 1 at one-third of full displacement.

It has been most simple to explain the action of this mechanism starting from shaft rotation and developing the accompanying piston travel which is of course the true case when starting or when the flywheel is carrynig a cylinder up its compression stroke. However the mechanism is fully reversible and the power of the firing strokes is delivered to the quill shaft 37 simply by reversing the travel of the forces from part to part.

The quill shaft 37 is mounted at its lower end in a ball bearing 38 supported inside the lower portion of control member 12. This bearing serves primarily as a thrust bearing, and is retained by a nut 39 and lock means 40 so that it is able to draw down on the quill shaft 37, and through the shaft 31, flywheel 24 and bearings 21 is able to hold the spherical surfaces of elements 12b and 18 in close running contact so that they serve to center the revolving and rocking mechanism in relation to the upper portion of control member 12. This also centers the shaft 31 and the upper end of the shaft 37, which may have a considerable clearance in the bore of the control member 12.

Figure 5:
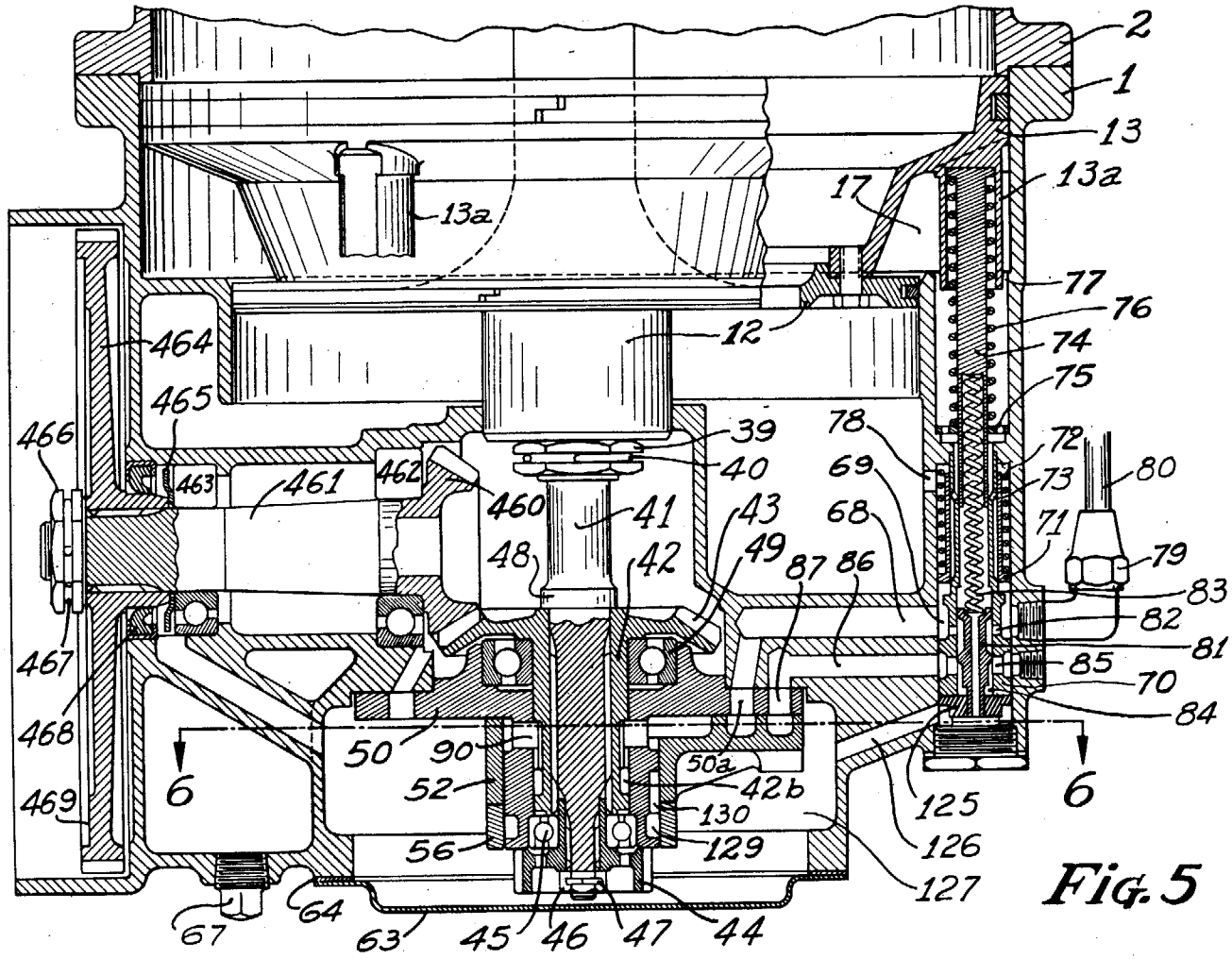
Fig. 5 is a vertical section through the lower portion of the mechanism, along line 5—5 of Fig. 3.

The quill shaft 37 is slidably splined to the upper portion of a shaft 41. A short quill shaft 42 surrounds and is splined to a lower portion of the shaft 41 and has a spiral bevel gear 43 formed integraly. A small gear 44, carrying a bearing 45 is fitted and splined to the lower end of the shaft 41 (Fig. 5). A nut 46, with lock means 47, holds the gear 44, the bearing 45, and the quill shaft 42 firmly against a shoulder 48 on the shaft 41, thereby positioning the shaft 41 in relation to the shaft 42 which is mounted in a bearing 49. The bearings 45 and 49 are mounted in a bearing plate 50 which is also bored to form a close running fit for the shaft 42.

Figure 6:
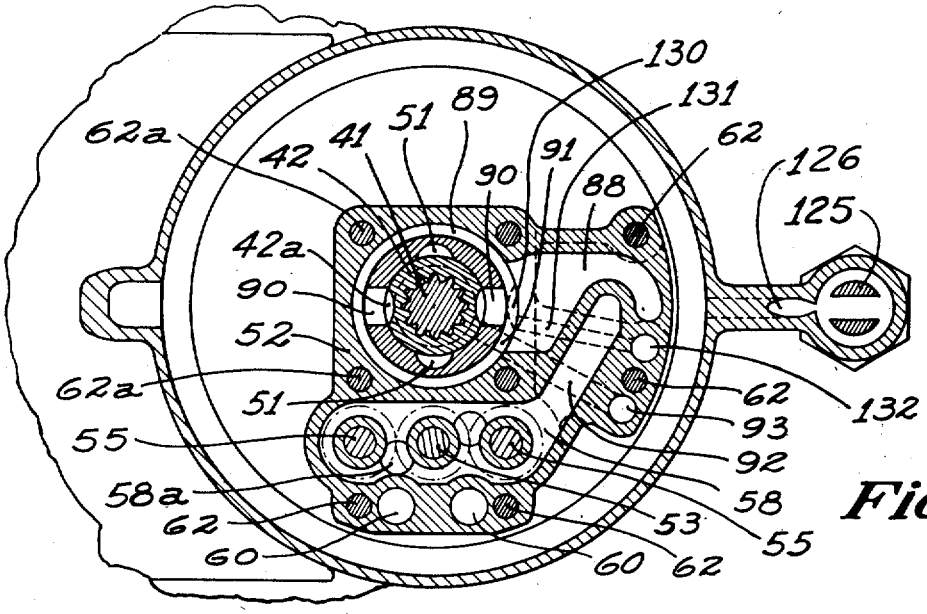
Fig. 6 is a horizontal section through a lower portion of the engine along line 6—6 of Fig. 5.

The bearing plate 50 has ports 51 milled therein, and the shaft 42 cooperates to act as a rotary valve by means of ports 42a (Figs. 5 and 6) milled therein and a communicating annular port 42b. A pump body 52 fits closely over the hub of the bearing plate 50 and has a gear chamber and a bearing for a gear pump gear 53 which has an integral shaft and is driven by a gear 54 splined thereto and driven by the gear 44. The pump gear 53 meshes with two similar integral shaft pumping gears 55 (Fig. 6), and the gears 53 and 55 are covered and retained by a pump cover 56 which also fits closely on and is located by centering on the hub of plate 50. A pin 57 (Fig. 2) gives the additional locating point required to keep the pump casing parts in full alignment. An outlet passage 58 is cored in the pump body 52 and discharge ports 58a (Fig. 6) provide communication between passage 58 and the chamber in which the pumping gears operate. The cover 56 has cored therein an inlet manifold 59 and ports which open into the pumping gear chamber. Passages 60 admit oil from the oil reserve space immediately above in the base casting 1 through tubes 60a which are provided to cause the oil to be taken in above the sediment level.

The base casting 1 is machined to locate and mount the bearing plate 50 which is held in position by cap-screws 61 and by longer cap-screws 62 which also serve to clamp the pump body 52 and cover 56 in position. Also four cap-screws 62a hold the pump casing parts together but do not enter casting 1, so that the pump assembly may be removed as a unit if desired. An additional nut 46a and lock means 47a are used to hold gear 54 in position. The oil pump assembly above described is closed in by a cover 63, sealed by a gasket 64. Screws 65 and lockwashers 66 hold the cover 63 in position.

The oil pump discharge passage 58 communicates with a passage 68 through a port 50a (Figs. 5 and 6) and the passage 68 delivers oil to an annular space 69 around a valve sleeve 70 which is stationary. Slidably fitted around the upper part of sleeve 70 is a relief valve 71, held down by a spring 72 which bears against a shoulder on valve 71 which is slidably fitted in base casting 1. Fig. 5 shows the valve 71 at its operating point, that is just "cracked." If raised slightly from this position by increase in pressure in annulus 69, oil is passed between parts 70 and 71, then through apertures 73, thence around a displacement responsive member 74 and through a perforated spring-seat washer 75 and passages 77 into the chamber 17. Three springs 76 are fitted in three extensions 13a of piston 13 and are proportioned to lift this piston and the weight of the attached parts when there are no pressures in the engine. One of the springs 76 holds the washer 75 seated.

The space in which spring 72 operates is vented to atmospheric pressure through a vent 78, consequently the operation of the valve is controlled exclusively by variations in gage pressure in annulus 69 therefore it functions directly to regulate this pressure and is not influenced by the fact that the escape of oil into chamber 17 as above described provides a useful outlet for this oil, using it at a lower pressure rather than letting it escape to atmospheric pressure. The pump gears 53 and 55 are so proportioned that the quantity of oil delivered is sufficient to keep a small amount of oil passing through valve 71 at all times, but at times when it becomes necessary or desirable to reduce the displacement of the engine the other uses of oil are less than normal so that a larger supply of oil for chamber 17 is always available when expanding of this chamber is necessary. It should be understood that this only insures supplying an adequate quantity of oil to chamber 17, and does not act to control the movement of control member 12 or piston 13, as this is controlled by governing the pressure maintained in the chamber 17 by means of a pressure governed valve which so adequately regulates the rate at which the oil is allowed to escape from this chamber that the rate of oil supply does not have any appreciable effect on the pressure.

A fitting 79 conveys oil into a tube 80 at the pressure controlled by the valve 71, and oil at this pressure is also admitted to the annular space around a spool valve 81 through ports 82 in sleeve 70. A spring 33 presses down on the valve 81 and its upper end is seated in the displacement responsive member 74. The valve 81 is shown in its cracked position, and the spring 83 is so proportioned that the force it exerts on the valve 81 as it holds this position is varied by vertical movement of member 74 to keep this force proportional to the displacement of the engine. An annular chamber 84 below valve 81 exposes a main portion of the lower area of valve 81 to the pressure of the oil in chamber 84. Since the oil supply pressure is balanced as to its effect on the position of valve 81, and atmospheric pressure is maintained in the chamber above by venting through the center of the valve 81 to its lower end and thence to atmosphere, the position of valve 81 is under the exclusive control of the force applied by spring 83 and the upward force exerted by pressure of oil in chamber 84. When these forces are balanced the valve 80 thus stays in cracked position as shown, while any drop in pressure in chamber 84 causes the valve to be lowered and admit more oil from the high pressure supply to restore a balanced condition, while if the pressure in chamber 84 should become too high the passage from the supply into chamber 84 is entirely closed off and thus the use of oil from chamber 84 returns the balanced condition. Therefore, with adequate supply pressure, the pressure in chamber 84 is maintained proportional to the displacement even under considerable variations in the flow of oil permitted from chamber 84.

Figure 3:
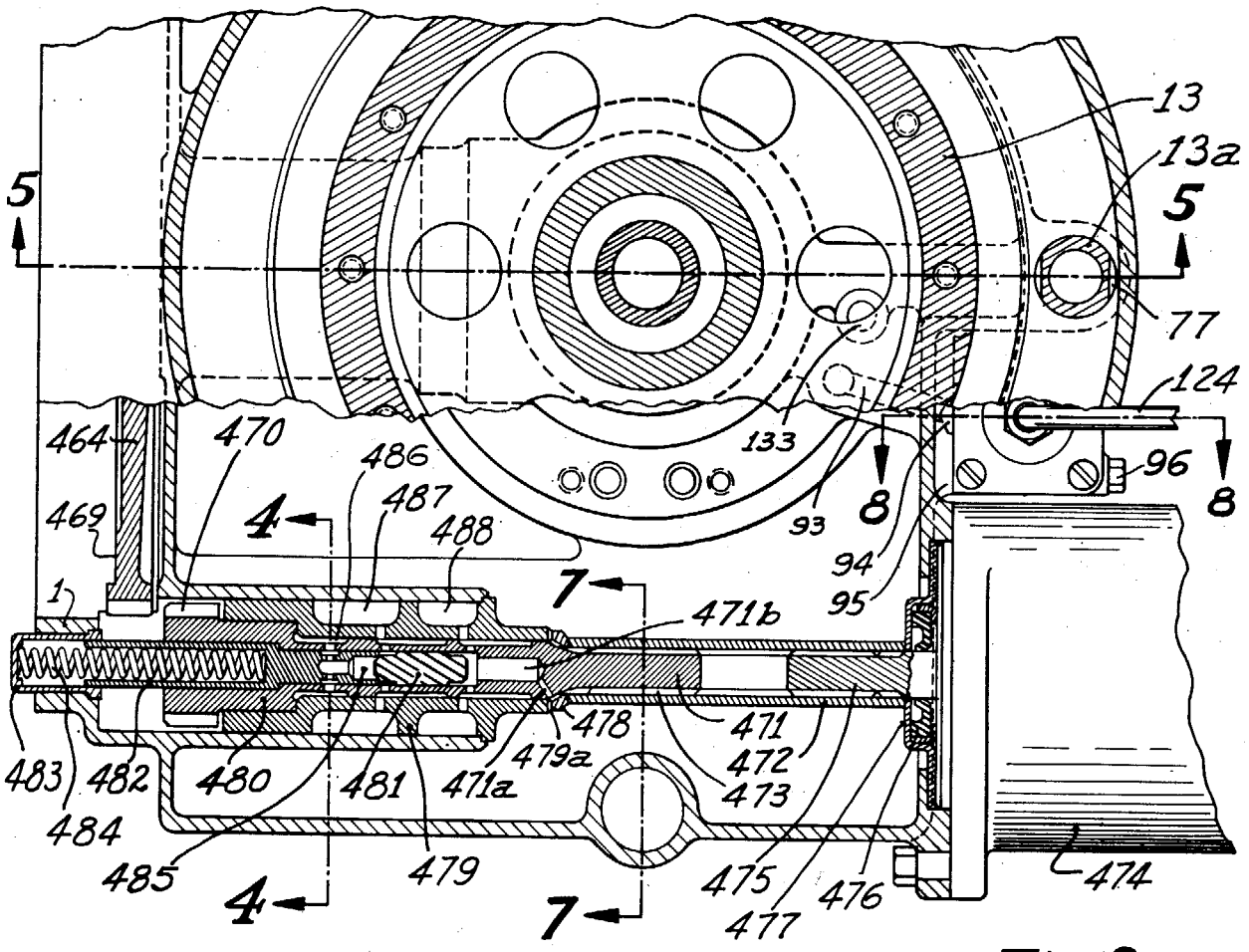
Fig. 3 is a partial horizontal section stepped as indicated by line 3—3 of Fig. 2.

Passages 85 through sleeve 70 convey oil from chamber 84 into a passage 86 in the base of casting 1, through a port 87 and a cored passage 88 into an annular groove 89 and ports 90 in bearing plate 50. As shaft 42 rotates, the ports 42a therein thus alternately connect the groove 42b with the ports 90 and 51, thereby causing the pressure in groove 42b to vary from atmospheric when connected to ports 51, to a pressure closely approaching the controlled pressure prevailing in chamber 84 when connected to ports 90. A port 91 through the hub of bearing plate 50 connects the groove 42b with a passage 92 through pump body 52 and a passage 93 (Fig. 3) through the pump body 52, bearing plate 50 and base casting 1 to a port 94 in a pad 95.

The fuel pump assembly shown in Fig. 8 is attached to the pad 95 by screws 96. Fuel is supplied from a tank 97 through a tube 98 and a soft synthetic rubber tube 99 which is fastened to a fuel pump body 100 and to the tube 98 by clamps 101. In the pump body 100 is a bellows 102 crimped and hard soldered to a mounting plate 103 which is set into body 100 and sealed with soft solder or oil-proof cement 104. A light spring in the form of a waved washer 105 supports a ring suction valve 106 against a valve plate 107 having a series of inlet perforations arranged in a circle above the suction valve 106 and another ring of perforations which are covered by a discharge valve 108.

The working surfaces of valves 106 and 108 and valve plate 107 are preferably lapped smooth and flat, but the flexibility of the valves may be such that they need only be truly flat when pressed into working position by the pressures available in use. The valve 108 is seated by a waved washer spring 108a.

An upper bellows 109 is crimped and hard solder sealed to a mounting piece 110, then mounted in a shell 111, and retained by a lock ring 112. Movement of the free end of the bellows 109 is limited by a stop plate 113 retained by a lock ring 114. This assembly is then sealed under gas pressure by soft soldering a passage 110a. The gas should be non-oxidising and non-condensing at ordinary temperatures such as nitrogen or helium for examples, and the sealed pressure should be somewhat less than the minimum pressure which is to prevail in chamber 84 at minimum displacement. The bellows should be of suitable proportions as related to the compressibility of the enclosed gas to then stand a considerable number of flexings to the point it will take when the maximum pressure available in chamber 84 is applied in the space surrounding it. The mounting piece 110 is made to fill a large proportion of the space within bellows 109 to reduce the total stroke of the bellows under the range of pressures to which it is subjected in service.

The shell 111 and two gaskets 115 are then clamped between a flanged cap 116 and the pump body by screws 117 and lockwashers 118 thus also clamping a gasket 119 and the valve plate 107. A stop pin 120 is affixed to the valve plate 107 and serves to limit the stroke of bellows 102 to a safe value for a moderate number of cycles. An accumulator check valve 121 is pressed against the top of the shell 111 by a waved washer spring 122, and opens under pressure difference to permit fuel to pass into the discharge opening in the top of flanged cap 116 and through a fitting 123 into a discharge line tube 124.

Referring again to Fig. 5 the smaller diameter portion of the valve 81 is a sliding fit in a spacer 125 which also acts as a lower stop for valve 81 when there is no pressure in chamber 84. A cross slot in the spacer 125 vents the small diameter end of valve 81 to atmospheric pressure through the passage 126 in the base casting 1 into a dry sump space 127. Oil leaking through fits in the valve mechanism as well as miscellaneous leakage in other parts of the unit may be drained into the space 127, particularly from sections where it is desired to avoid excess oil accumulating.

When oil drained into the space 127 reaches a level above the bottom face of gears 44 and 54 a certain part of this oil runs into the gear teeth as they are about to mesh, and some of this oil is forced upward against the bottom face of the hub of bearing plate 50 which is in free running contact with the tops of these gears. A port 128 (Fig. 2) is provided in this face just above the closing mesh point of the gears and receives oil at an appreciable pressure. The port 128 communicates with a groove 129 and a port 130 in the bearing plate hub and then through an angular passage 131 which joins a vertical passage 132, which registers with a continuing vertical passage 133 through base casting 1 and bearing plate 50. This chain of passages serves to convey oil from the mesh of the gears up to the top of passage 133 where it flows down into the oil reserve space in the base casting. Any rise in the oil level in space 127 increases this flow, which is adequate to keep the space 127 cleared of all oil except an amount to keep the gears well lubricated.

I have found in practice that an open gear pump of this character will pump more effectively when the gears are helical. Oil trapped in the teeth of helical gears travels axially along the meshing teeth toward the last ends of the teeth to mesh. Since the rotation of shaft 41 is counterclockwise when looking at the top end, the gear 44 has a left hand helix and the gear 54 a right hand helix as indicated by the diagonal lines near the mesh point of these gears in Fig. 2. These helix angles aid the lift of oil and assure quick transfer of oil from the dry sump to the reserve when considerable oil has accumulated in the dry sump after a long period of non-operation.

For similar reasons the transfer of oil from the inlet manifold 59 to the discharge passage 58 is facilitated by having the gears 53 and 55 helical cut at a suitable angle in relation to the direction of rotation.

Figure 7:
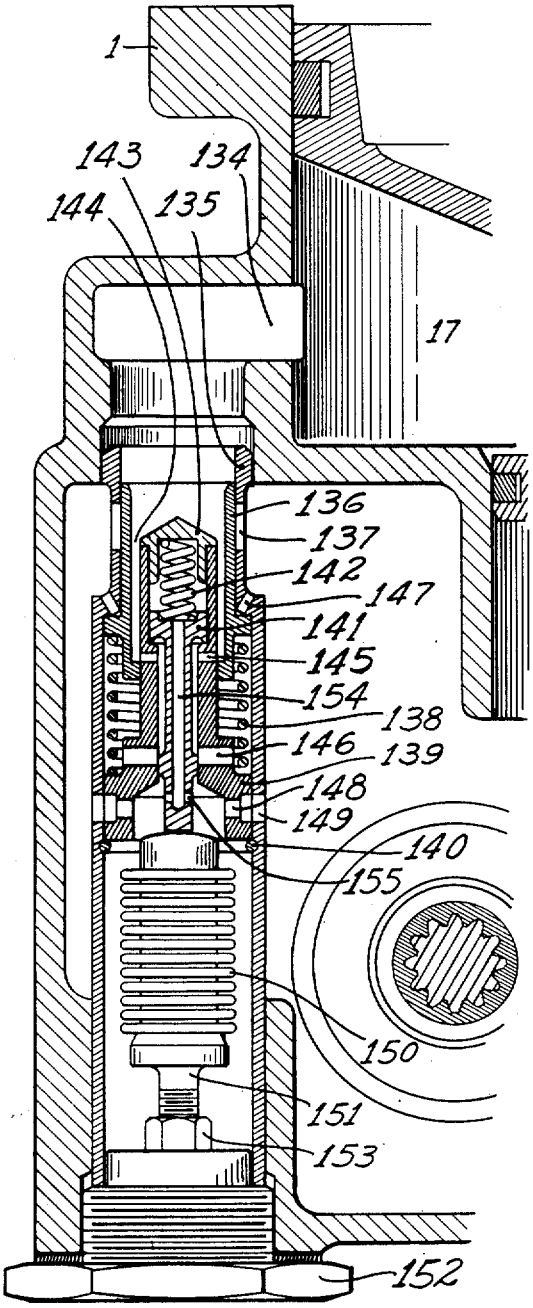
Fig. 7 is an enlarged partial section through the engine base along line 7—7 of Fig. 3 and 2—2 of Fig. 1 showing detail not shown in Fig. 2.

The chamber 17 is kept supplied with oil by means which have been described and is provided with an outlet port 134 and a pressure governed valve (Fig. 7) comprising a valve shell 135 in which is slidably fitted a valve 136 which is arranged to uncover several large ports 137 when moved downward. The valve 136 is supported on a light spring 138 which is seated at its lower end upon a stationary member 139 which is tightly fitted in sleeve 135 and is prevented from being forced down by fluid pressure by a lock ring 140. The member 139 is axially bored and counter-bored to provide two diameters as shown, and a pilot valve 141, having two corresponding diameters is slidably fitted therein. The valve 141 is pressed downward by a suitably proportioned spring 142 retained by a plug 143 sized for a firm press fit into the upper portion of member 139. An annular passage 144 admits oil from port 134 to cross passages 145 which convey it to an annular space around valve 141 and from there out through ports 146 when the pilot valve is at its downward position as shown. This applies the pressure being carried in chamber 17 to the entire lower end area of the valve 136. Vent passages 147 connect the upper side of the shoulder area to atmospheric pressure, so as long as pilot valve 141 remains in the position shown the ports 137 remain covered since the pressure carried in chamber 17 is strongly urging valve 136 upward since it is applied to a larger area below than above this valve.

However if the pressure in chamber 17 rises sufficiently this pressure acting on the exposed under area of the larger diameter portion of pilot valve 141 will cause a force upward exceeding the downward force applied by spring 142, moving valve 141 upward to a point where ports 146 are sealed from the supply pressure and act to exhaust oil from under the valve 136 into the space around the lower portion of valve 141. Ports 148 and 149 then convey this oil from there to the general oil reserve. This causes pressure of oil on the exposed upper surfaces of valve 136 to quickly move it down to completely uncover the ports 137 providing an ample outlet from chamber 17.

Since a substantial portion of the force resulting from the pressure on top of the engine pistons 4 is transferred, through apparatus that has been described, to the piston 13 and thus places the oil in the chamber 17 under pressure, a suitable pressure applied to the pistons 4 will cause the valve 141 to act as above described and the ports 137 will rapidly discharge oil until the pressure on the pistons is reduced or the control member 12 has reached its extreme bottom position stopped by resting on the central portion of base casting 1. The port 134 is so positioned that it is only slightly open when the control member 12 and piston 13 reach their bottom position, thus slowing up the last part of the downward travel to avoid shock when the stop is reached. When a suitable pressure on the pistons is exceeded the displacement of the engine may therefore be very rapidly increased, but the rate of decrease is limited by the amount of oil spilled to chamber 17 by the valve 71. The direction of movement of the displacement control member is however determined entirely by whether the pressure in chamber 17 is over or under a certain critical value, with the pressure in chamber 17 in turn determined by the pressure applied to pistons 4.

The pilot valve 141 may hover at a mid-point when the pressure in chamber 17 is being held at a certain value, and then the valve 136 will settle in a position where the ports 137 are open just sufficiently to outlet the oil that is being admitted to chamber 17 by the valve 71, thus maintaining the critical pressure.

The average pressure applied to all the pistons 4, which may be called the mean working pressure, depends mainly on the pressure of the air in the intake manifold, and on the amount of fuel being ejected into the cylinders. It depends to some extent on other factors, but the principal other factors are the effect of engine speed and load on these main factors. Increased load decreases the engine speed and so increases the manifold pressure at a given throttle opening. Since the injection is normally kept coordinated with air weight per cylinder charge to maintain the fuel/air ratio, the principal means of varying the mean working pressure applied to the pistons is by varying the inlet manifold pressure, either by control of throttling or more indirectly by changing the load on the engine.

The spring 142, governing valve 141 and through it the engine displacement, is made light enough to yield under the pressure in chamber 17 resulting from operation with normal fuel/air ratio at near atmospheric pressure in the manifold, causing displacement to increase rapidly under this condition, and strong enough to hold valve 141 below its critical point when the mean working pressure on the pistons is suitably and moderately lower, causing the displacement to decrease under this condition. Displacement may be therefore increased by throttle opening or increased engine load, and reduced by reduced load or by closing of the throttle.

Operation at high altitudes would be accompanied by such low atmospheric pressure that the manifold pressure could not be high enough to bring about increased displacement if the above described control means were not provided with atmospheric pressure compensation. This is accomplished by a bellows 150 which is vacuum sealed and soldered to a mounting piece 151 which is threaded into a cap 152 which in turn is threaded into the base casting 1. The valve shell 135 is press-fitted to the cap 152 after the position of the bellows 150 has been suitably adjusted and locked by a nut 153. Passages 154 and 155 are provided through valve 141 to vent its upper end to atmospheric pressure. The bellows and mounting piece 151 being sealed under a vacuum, the upward force applied to the bottom of the valve 141 by the top of the bellows is increased if the pressure in the space around this bellows is reduced. Since this space communicates through ports 148 with the general oil reserve space which is at atmospheric pressure, any drop in the atmospheric pressure prevailing increases the upward force exerted by this bellows. This reduces the oil pressure necessary to hold the pilot valve 141 at its critical operating position against the force of spring 142, thus resulting in a lower pressure being maintained in chamber 17 so that the reduction of the pressure available to apply to pistons 4 due to the reduced atmospheric pressure is compensated by a reduction of the critical pressure governing chamber 17, to thus permit increase or decrease in engine displacement in response to throttle, injection and load, just as when the atmospheric pressure is normal.

The fuel discharge line tube 124 of Fig. 8 leads to the fuel control mechanism shown in Figs. 9, 10, 11, 12, and 13, and is connected by a fitting 156 to the control box 157. A duct 158 drilled in box 157 conveys fuel to an annular groove 159 in a sleeve 160 which has cross-drilled inlet ports 161. A spool valve 162 having a small diameter stem at its upper end is slidably fitted inside the sleeve 160 and is urged upward by a spring 163. A cap 164 is slidably fitted on the stem and press fitted into the upper end of sleeve 160 which also has low pressure outlet ports 165 and controlled pressure outlet ports 166. The spring 163 is preferably so proportioned as to just support the weight of the parts resting upon it, so the effects of this spring and of the weight of the parts may be disregarded in considering the operation of the valve. If no added force is applied to the upper stem of valve 162 any pressure of fluid below will raise it from the position shown, sealing off ports 161 and stopping flow into the valve 162 and opening ports 165 to communicate through the center of the valve 162 with the space below it, reducing the pressure in ports 165 and 166 to substantially zero. On the other hand, if a downward force is applied to the stem of valve 162 the ports 161 are opened, admitting fuel from passage 158 to pass through the passages in valve 162 to increase the pressure ports 166 until an equal upward force is thereby created thus closing ports 161, so it is apparent that the pressure in ports 166 over and above that prevailing in ports 165 can be controlled by the force applied to the stem of valve 162 and that up to the limit of the supply pressure the outlet pressure in port 166 over and above that prevailing in port 165 is substantially directly proportional to the force applied to the stem of valve 162.

With fuel being supplied at substantial pressure in passage 158 the movement of valve 162 required to maintain this outlet pressure difference proportional to the applied forces are very small, regardless of the rate at which fuel is used from port 166, within the actual range of used rates. A pasage 167 connects ports 166 with a discharge port 168. Another valve sleeve 170 is fitted in the fuel box 157 and a valve 171 is slidably mounted in the upper portion thereof. A small diameter stem 172 on valve 171 is slidably fitted in the lower portion of sleeve 170. Valve 171 also has a small diameter upwardly extending portion which serves to limit its upward motion. A plug 173 retains the sleeve 170 and serves as an upper stop for valve 171. The smaller diameter bore in the lower portion of sleeve 170 extends through the lower end, and communicates with the passage 167, and also through cross ports 174 and passage 175 communicates with ports 165. A continuation 176 of passage 175 also communicates with a port 177, and a passage 178 and ports 179 communicate with port 177.

The lower end of stem 172 is exposed to the pressure of fuel in passage 167, so tends to lift valve 171. When valve 171 is raised to its upper stop, the ports 174 are fully uncovered and fuel from passage 167 is admitted to the above described chain of passages, causing pressure to be applied to the top of valve 171 tending to press same down and cover ports 174. The action of this valve is therefore such that the forces applied by the fluid pressures effective against the ends 171 and 172 become equal, at least when a moderate amount of fuel is being taken from port 177, and the valve settles in a position such as to just allow this much flow through ports 174. The pressures which accompany these forces are inversely proportional to the areas. Since the diameter of valve 171 may suitably be five to six times that of stem 172 the ratio of areas may be 25 to 36 to 1 for example, and the pressure above atmospheric in port 177 is thus maintained at one twenty-fifth to one thirty-sixth of that prevailing in passage 167 and port 168 and any relationship so established is held for all variations of pressure in 167 except for minor effects of weight and friction of valve 171 and stem 172.

Ports 180 vent the annular space directly under the head of valve 171 to atmospheric pressure through a passage 181 and an intersecting passage 182 which communicates with the inside of the fuel box which is maintained at atmospheric pressure by venting a fuel box cover 183 through an aperture 184. A circumscribing groove 185 is also vented to atmospheric pressure by passage 181 and the others described, and this also serves to prevent pressure rise in the space under valve sleeve 160 by being connected to this space by passages 186 and 187.

An air passage 188 communicates with the lower portion of a chamber 189 formed integrally with control box body 157. The chamber 189 is closed at its bottom end by a plug 190 which compresses a gasket 191 and carries affixed to its upper end a bellows 192 crimped to a stud 193 and sealed under a vacuum. Nuts 194 serve to adjust the bellows position and to lock same in position. The upper end of bellows 192 bears against a pin 196 slidably fitted centrally in the top wall of chamber 189 and the top end of pin 196 bears against an arm of a bell crank 197 which is held against the pin by a torsion spring 198. The proportions of the associated parts, particularly the spring 198, the bellows 192 and the bell crank 197, are preferably so chosen that when sea-level atmospheric pressure prevails in passage 188 and the connected spaces the bell crank 197 takes substantially the position shown, and travels progressively from this position to a position where the upper arm of the bell crank is vertical, as the pressure in passage 188 is reduced to any suitable predeterminated low value, for example 3#/sq. in. absolute.

A stationary pivot shaft 199 supports the bell crank 197 in a free-running but fluid sealing fit, and has a port 200 which communicates through a passage 202 in the center of the shaft with a cross passage 203 which joins an annular groove 204. A vertical passage 205 is drilled in the fuel control box 157 and conveys fuel pressure from passage 158 to groove 204. The bell crank 197 has a ball 206 closely but rotatably and slidably fitted in a bore in its upper arm and supported by a spacer 207 loosely fitted in the same bore which extends inward to the pivot bore of the bell crank. Here it communicates with port 200 thus receiving fuel under pressure from the passage 158. This fluid pressure is used to press the ball 206 outward to produce a force exactly proportional to the pressure in passage 158, and flow in the connected passages is only such as is required to make up leakage. Vent ports 208 allow pressure seeping into the side of the pivot bearing opposite the ball to escape thus maintaining a closer approach to balancing the hydraulic pressure load on the pivot bearing.

Above the bell crank 197 a rocker arm 210 is pivoted on a small pivot pin 210a which is a rockable fit in the arm 210 and in the two vertical bosses of the fuel box 157 which support its outer ends. Screws 209 which hold the cover in position also prevent the pin 210a working out of position axially. The under side of rocker arm 210 has an arcuate surface centering on the axis of the pivot shaft 199 when the arm 210 is in its normal position and this surface forms a track or raceway upon which the ball rolls as the bellcrank 197 swings. The opposite end of rocker arm 210 also has on its lower side an arcuate surface which bears on a roller 211 running on a sleeve 212 held between the upper ends of the side flange portions of a lever 213 by a rivet 214. A pin 215 is also riveted in position, and slidably retains the upper end of a thermally responsive element 216 made of bimetallic sheet. The element 216 is slotted to improve its thermal responsiveness in the desired direction. The lower end of lever 213 is wider than the upper end and the ears at the lower end of the side flange portions are pivoted freely on stepped rivets 217 which are headed-up on side flanges 218 of a pressure lever 219 which is pivoted freely on the small diameter ends of screws 220 which are locked with lock-washers 221. Rivets 222 secure the lower end of the thermal elements 216 to the transverse portion of the pressure lever 219.

The arcuate surface of lever 210 against which the roller 211 bears is centered at the pivot center of rivets 217 when the parts are in normal working position. A light leaf spring 224 is secured to the rocker arm 210 by means of a screw 225, and an adjusting screw 226 bears against the free end thereof. A coil spring 227 presses against this screw to hold its setting against the effects of vibration.

Screws 229 attach the fuel control box to a support pad 230 with gaskets 231 and 232 sealing the joints. The gasket 232 is preferably cut from the center of 231 and left connected by small fibers until assembled, to insure an equal thickness of material in these two gaskets.

A small bushing 234 with a suitably sized orifice drilled therein is pressed into the outer end of passage 182. A port 235 communicates with its outer end and admits fuel to the orifice where it flows through at a slight pressure drop and low rate, then through passage 182 into the interior space of the fuel control box. This fuel and other fuel accumulating due to miscellaneous leakage is drained out through passage 236 and a fitting 237 to a tube 238 which returns it to the main fuel supply by gravity.

Fig. 14 shows a horizontal section through the head of the engine, with a portion of the fuel box shown in its mounting position thereon. The left half of this section is along a line which coincides with the centerline of passage 167 and port 168 in Fig. 9. On this level there are fourteen drilled passages 239 connected by the spaces 240a behind the plugs 240 in five places, by an annular passage 242 in one place, by the port 168 in one place and by annular passages 241 in seven places, thus connecting all the passages 239 to form a continuous loop passage, which is supplied with fuel under metered pressure from passage 167. A duplicate set of fourteen drilled passages 243 on the level of ports 235 and 177 connects through additional spaces 240a and seven annular passages 244 and an intersection 243a (Fig. 2) to form a loop which is broken only by the fact that the ports 235 and 177 are not interconnected directly. Fuel at a pressure slightly above atmospheric enters this circuit from ports 174 through passage 176 and port 177 and returns to port 235, then is discharged through the orifice in bushing 234. This keeps a slow flow in this circuit which serves to discharge any accumulated air and to keep a continuous flow to avoid pressure building up by leakage in such a way as to defeat the purpose of valve 171—172, while the orifice in bushing 234 makes it possible to keep up low pressures in this circuit without undue flow of fuel causing too much drain on the supply in passage 167.

The injectors (Figs. 24, 25, and 26) are thus supplied with fuel from annular passages 241 at a precisely controlled metering pressure and ample and unmetered volume and the annular pasages 244 also contain a supply of fuel at a low pressure which may be drawn upon slightly or may receive small amounts of added fuel from the injectors without disturbing the pressure.

Referring now to injector embodiment shown in Figs. 25 and 26, each injector receives fuel from the annular passage 241 surrounding its lower portion. Ports 245 in a shell 246 admit fuel to an annular manifold space formed in the outer body of a metering cylinder 247. Restrictive passages 248 admit fuel to an annular relief groove in the bottom face of metering cylinder 247. A check valve 249 in the form of a centrally perforated disk is seated against this face by a waved washer spring 250, which is seated on a nozzle body 251 which is tightly fitted in the lower end of shell 246. A tubular spacer 250a holds down the nozzle body 251 and also serves to loosely center the valve 249. A nozzle valve seat bushing 252 is tightly fitted in the lower end of nozzle body 251, and a nozzle valve 253 is fitted therein. The stem of this valve is appreciably smaller than the bore of the bushing 252 but has a larger diameter portion which is snugly but slidably fitted in this bushing. This larger diameter portion has grooves cut through it for passage of fuel, and lands between the grooves form the bearing surfaces. An injection pressure control spring 254 is seated in the bottom of nozzle shell 251 and its upper end bears against a retainer 255 held in position by a split or cut spring lock ring 256 which engages a groove in the upper part of the stem of valve 253. One or more apertures through retainer 255 permit passage of fuel, and allow the retainer to be a close sliding fit in the upper part of nozzle body 251.

A metering piston 257 is slidably fitted in cylinder 247. This fit need not be exceptionally snug or fine as might be expected, for reasons that will appear hereinafter. Piston 257 has a flanged top portion which seats tightly against the top surface of cylinder 247 and its lower face has two shallow cross grooves. The lower face surfaces between these grooves are so spaced from the lower face of the flange as to project a few thousandths of an inch beyond the bottom face of cylinder 247 when the flange is firmly seated against its top face. The piston 257 is bored to a thin wall for lightening purposes, and a metering spring 258 of precision manufacture is seated on a shoulder near the bottom of this bore. Its upper end is seated against a stationary spacer 259 which also has seats for a spring 260 and a spring 261 which operates inside of spring 260. A check valve 262 is seated by spring 261 against a slide-valve 263 in which it is also slidably guided. The check valve 262 has an orifice passage through its center allowing a restricted flow of fuel in a reverse direction. The slide valve 263 is pressed upward by spring 260 and operates in a ported bushing 264 which has a full diameter portion snugly fitting the bore in shell 246. Below this a sealing ring 265 of somewhat plastic metal such as annealed copper serves to space bushing 264 from spacer 259 and to conform under high internal pressure to seal against any serious leakage.

A bellow 266 is crimped to a mounting piece 267 and at its free end to a cap 268 having a shallow bore to form a sliding fit for the top end of a coiled air purge tube 269, the bottom end of which is tightly fitted in mounting piece 267 which has a transverse passage 270 communicating with the passage in the air purge tube and passing through a shell 271. The crimped joints at the bellows ends and the joint between mounting piece 267 and shell 271 are preferably sealed with solder or other sealing agent to make these joints completely fluid tight. Passages through the mounting piece 267 give open fluid communication from the top of piston valve 263 to the interior of the bellows.

Around the mounting piece 267 and the lower end of shell 271 there is a thin annular passage with which the transverse passage 270 communicates and the upper portion of this annular passage connects with the upper portion of annular chamber 244 through vents 272 which allow escape of air or gases, while additional vents 273 are primarily for the inlet or outlet of fuel at low pressure from the port 177 of the fuel control box. The inside of the bellows and all injector chambers below this level are normally filled with fuel, while lubricating oil is the fluid used in the spaces around and above the bellows, which serves to transfer pressure and fluid displacement from lubricating oil to fuel without the two fluids becoming intermingled by any leakage or seepage.

The upper portion of shell 271 has slidably fitted therein a multiplier piston 274 which is pressed upward by a spring 275 and retained by a lock ring 276 which also serves as an upper stop. An annular port 277 is connected by a passage 278 to a drilled pocket 279 which becomes filled with oil by leakage past the large diameter end of piston 274. The chamber around spring 275 is kept drained above this level by a passage 280 draining into an annular groove 281 and out through a port 282.

A retainer 283 surrounds the upper portion of shell 271 and also presses it down against the top surface of a plastic metal or elastic synthetic gasket 284, which yields to allow adequate pressure on a gasket 285 sealing the joint between retainer 283, shell 246, and the wall of the socket in which the injector is mounted. The combined pressure against these two gaskets is also available to compress gasket 286 to seal against fuel seeping slowly into the cylinder head from annular passage 241. An enclosed cut spring lock ring 287 has clearance behind it for assembly purposes and clearance above in the retainer 283 to allow for gasket compression. This lock ring permits retainer 283 to also serve as an extractor, and the concealed locking means prevents uninformed persons gaining access to the working mechanism but permits opening for service by use of suitable tools. Apertures 288 permit access to separate the parts with such tools.

An annular passage 289 is connected to the space above the piston 274 by a cross passage 290 and an annular drain groove 291 communicates through a cross passage 292 with a drain groove around a check pin 293. The check pin 293 is pressed upward by a coiled spring 294 and retained by a lock ring 295. Holding this pin down holds piston 274 at its bottom position, placing the injector out of action for checking purposes, just as spark plugs are frequently short-circuited for the same purpose.

A modified form of injector, particularly suited to the requirements of this engine is shown in Figs. 2, 17, and 24. Fig. 2 shows the exterior of this injector in working position, while Fig. 17 shows a section through the upper portion of this injector. Details of the lower portion are too fine to show in Figs. 2 or 17 and are shown to a much larger scale in Fig. 24.

Each injector receives fuel at accurately metered pressure from annular passage 241. Ports 245' admit fuel through orifice passages 248' in metering cylinder 247' to check valve 249' which has a central aperture and an annular groove which registers with a similar groove in the bottom face of the metering cylinder 247'. The abutting plane surfaces are lapped smooth and flat. A waved washer 250' of spring material seats check valve 249', and a nozzle body 251' supports the spring washer 250' and is tightly fitted in the lower end of a shell 246'. A tubular spacer 250a' separates cylinder 247' and nozzle body 251' and provides a gaged space therebetween for operation of the check 249' and the spring 250' which both fit loosely inside this tubular spacer. A nozzle valve seat bushing 252' is tightly fitted in the lower end of nozzle body 251' and has a flanged head to retain it against high internal fluid pressure. A nozzle valve 253' is slidably fitted therein and has a head portion which seats against the bottom of bushing 252'. The seating surfaces are preferably not flat, but rather in the form of a nearly flat cone or portion of a relatively large sphere to give a somewhat umbrella-shaped spray form and these surfaces are preferably lapped together to form a fine tight seal until the valve is opened.

The stem of valve 253' has a helical groove for the passage of fuel, and a helical land between adjacent turns of the groove forms the bearing surface fitting in the bore of the bushing 252'.

A spring 254' is seated on the head of bushing 252' and a retainer 255' is held in position by a hairpin shaped spring lock 256' which engages a cross groove in the upper part of the stem of valve 253', and is confined in a cross slot in the top of the retainer 255'. The retainer 255' has a round outside contour and, parallel to the slot for lock 255', flats are provided to form passages for fuel and to facilitate its being turned in relation to lock 256' in which position the spring 254' is able to assist the spreading of lock 256' to release retainer 255' and allow removal of nozzle parts without removing nozzle body 251' from shell 246', permitting these two elements to be integral if preferred.

A metering piston 257' is slidably fitted in metering cylinder 247' and has a flanged shoulder portion at its upper end and two shallow cross grooves at its lower end, with flat lands between these grooves. The piston and cylinder are so proportioned that when the flanged shoulder of the piston is firmly seated against the top face of the cylinder these bottom lands project slightly below the bottom of cylinder 147' and bear on and slightly unseat the check valve 249'. A metering spring 258' of precision manufacture is loosely fitted in the hollow center of the metering piston and bears against the bottom end thereof. A spacer 259' retains the upper end of spring 258' and a heavier spring 260' presses downward on spacer 259' and upward on a piston valve 263'. A weighted check valve 262' is guided in piston valve 263' and seated against same by a coiled spring 261' located within the spring 260' and also seated against spacer 259'. The check valve 262' has an orifice through its center allowing a very restricted or slow flow of fuel in a reverse direction. A ported bushing 264' has a bore for the valve 263' and ports which are just slightly open to the two annular grooves in valve 263' when it is at its uppermost position as shown. The flanged shoulder on the bottom of valve 263' which bears against the bottom face of bushing 264' facilitates close control of the amount of the area of the ports in bushing 264' that is uncovered by valve 263' when it is at its uppermost position, as well as facilitating control of the amount of downward travel the valve 263' takes before closing off communication of these ports with the lower groove of this valve. Slots shown in the flanged shoulder of valve 263' permit passage of fuel out of the space below, when the ports in bushing 264' are slightly uncovered as shown, and the resistance to flow may be controlled by controlling the amount of port area uncovered as above described.

A bellows 266' has its lower end spun and solder sealed to a mounting piece 267' and its upper end similarly affixed to a cap 263' having a small bore in which the upper end of a capillary air purge tube 269' is slidably fitted. This tube is coiled to accommodate a considerable length of tube in a small space to secured adequate flow resistance, and also to allow its upper end to flex vertically with vertical flexing of the free end of the bellows, after the end of the tube has seated against the end of the bore in cap 268' to thus give increased resistance to flow. The lower end of the purge tube 269' is tightly fitted in the mounting piece 267' and through the passages 270' and 272' communicates with annular passage 244 of the low pressure fuel circuit in the cylinder head. Ports 273' in shell 246' and adjacent ports in piece 267' place the ports in bushing 264' also in communication with passages 244 of the low pressure fuel circuit. Passages through mounting piece 267', one of which is seen in Fig. 24, place the space inside the bellows 266' in free fluid communication with the space immediately above the slide valve 263'.

The mounting piece 267' screws into shell 246' and is fitted on diameters above and below the threads to insure alignment, the fit below the threads also serving to resist excess leakage. A gasket 285' is clamped between these two parts and a retainer 283' is screwed on to a thread on the upper portion of mounting piece 267' and also bears against this gasket and fits on a diameter on piece 267' to aid alignment.

A liner 271' is tightly fitted in the retainer 283' above the bellows, and a multiplier piston 274' having two working diameters is slidably fitted in two bores therein. It is pressed upward by a spring 275' and at its uppermost position uncovers a narrow lower portion of an annular port 277' connected to an annular groove 278' in the outside of liner 271'. Apertures 279' convey oil which leaks past the large diameter portion of piston 274' into groove 278' and thence to port 277'.

Ports 280', annular groove 281', and passages 282' are provided to keep the oil in the pocket around spring 275' from accumulating above the level of these ports by draining into oil drain annular clearance 298. A check pin 293' is held upward by piston 274' or by oil pressure when this piston is pressed down by oil pressure. Pin 293' is retained by a larger diameter portion 294' and sealed by a conical seating surface 295'. Its functions in use are the same as those of the check pin 293 in the other injector embodiment.

A dust cap 296 screws on to the upper portion of retainer 283 or 283' and bears against a gasket 297 to seal either form of injector against the intrusion of abrasive dirt.

When piston 274—274' is at its top position as shown, its lower end uncovers a small portion of the lower portion of port 277—277'. This opening extends around the full diameter, to provide maximum area in relation to the stroke required to close it. This port permits the bellows 266—266' to expand to its free length before each injection, and also serves to keep the space around the bellows filled with oil and free from air or vapors.

Each injector has an annular chamber 289 connected by cross passages 290 with the interior of retainer 283—283' wherein the pressure prevailing in chamber 289 is applied to the large diameter end of multiplier piston 274—274' creating a multiplied pressure under the small end of the piston as soon as port 277—277' is closed off by piston movement.

Each injector also has a groove 291 around the retainer 283—283' which is connected by a passage 291a (Fig. 17) to an annular groove 299. Passages 300 connect this groove with a small upper oil reserve chamber 301 having overflow outlets 302. Leakage from chamber 289 into groove 291 is thus gathered in chamber 301. Passages 292 are also provided to convey leakage past pin 293—293' into groove 291.

Passages 303 and continuing passages drilled in casting 304 place the chamber 289 of each injector in individual communication with one of a circle of seven ports 305 which are evenly spaced in a distributor ring 306 which is press fitted in casting 304. A distributor rotor 307 has four contact pieces 308 evenly spaced around its periphery and each is slidably fitted on two diameters. Four springs 309 hold contact pieces 308 in sliding engagement with distributor ring 306 which has a portion of its inside surface formed to a spherical contour. The outer ends of contact pieces 308 have mating spherical surfaces, permitting each of them to take any position about its individual axis without interfering with perfect contact. The spring pressed feature permits proper contact to be made under all operating variations in temperature, while hydraulic pressure applied to the inner ends balances hydraulic pressure which seeps into the contact surfaces thus preventing the contact pieces from being forced inward by seepage pressure.

A cam rotor 310 has an integral quill shaft 311 on which the distributor rotor 307 is press fitted. Four studs 312 are fitted and equally spaced in cam rotor 310 and retained by lock rings 313 which register in four pockets machined in the distributor rotor 307 and thus form driving dogs for same.

Planet gears 314 are rotably mounted on the lower ends of studs 312, and carry integral pinions 315. A stationary ring gear 316 with internal teeth meshes with the planet pinions, while a pinion 317 integral with a quill shaft 318 is driven by means of spline teeth 319 at engine shaft speed and meshes with the gears 314. The purpose of these gears is to drive the cam rotor 310 and distributor rotor 307 at one-eighth engine shaft speed. The pinion 317 may have forty teeth, the gears 314 each fifty-six teeth, the pinions 315 each twelve teeth, and the ring gear 316 must then be of sixty internal teeth. If the studs 312 were stationary this would cause the ring gear 316 to be driven backward at one-seventh the speed of the pinion 317 but, as will be readily understood by those familiar with gearing of the planetary type, when the ring gear is held stationary the pinion 317 then turns eight revolutions for each revolution of the rotor assembly in which studs 312 are mounted, and the rotation of this assembly is then in the same direction as the rotation of pinion 317. Many other tooth combinations can be found which will produce the required speed ratio, but there are several other requirements which must or should be met in an arrangement of this sort, one being simultaneous meshing with four identical clusters 314—315 which is attained by the tooth numbers here given by way of example.

The shaft 30 which is driven by pin 29 and link 27 carries integral internal spline teeth 320 meshing with spline teeth 319. One tooth is omitted from one set of spline teeth and one tooth space from the other to make it only possible to mesh these splines in one position in 360 degrees of rotation in respect to the other. A spring 321 which bears on a washer 322 allows the quill shaft 318 to be held up to a point where splines 319 are completely out of mesh, without fully unmeshing pinion 317, with all the other parts in position. Thus if these teeth are not aligned to mesh at assembly, the assembly can be completed and the spring 321 will then mesh the splines on the first turn of shaft 30. The planetary gears are preferably helical cut rather than straight spur type, and the helix angle of pinion 317 may then be such that the load reaction assists the spring 321 in holding the quill shaft 318 down to position.

A ball bearing 324 is mounted in cam rotor 310 and a similar bearing 325 is mounted in the upper portion of the casting 304. A timer shaft 326 is mounted in these bearings and a plug 327 is screwed into the shaft and retains bearing 325, a lock washer 328 and an oil deflector 329. The plug 327 has fitted diameters above and below the threads to maintain accurate alignment with the shaft 326. A cap 330 is bored in its lower wall to form a running fit for the upper portion of plug 327, and is accurately centered by fitting on a small upper portion of the outer race of ball bearing 325. An accumulator piston 331 is slidably mounted in a bore in plug 327 and is retained by a shoulder at the top thereof. A spring 332 is coiled from tubing made of high grade spring steel and serves to press upward on the accumulator piston 331. A multiplier-accumulator piston 333 is pressed downward by the lower end of spring 332 and has a large diameter portion slidably fitted in a bore in timer shaft 326, and a smaller diameter portion slidably fitted in a bore in a bushing 334 which is press fitted in shaft 326.

A governor pop quill 335 is slidably fitted in piston 333 and also in the lower portion of bushing 334. A flange on its lower end is slidably fitted in the shaft 326 and a pop quill spring 336 is seated against bushing 334 and bears down on this flange. A main governor quill 337 is slidably fitted over the lower extension of pop quill 335 and has helical external splines slidably fitting in helical internal splines formed in the lower portion of timing shaft 326. These splines are of the skip tooth type for one position meshing, and the helix angle is so selected as to suitably advance the angular position of timing shaft 326 as the governor quill 337 rises as the engine speed increases. The main governor quill 337 has a flanged lower portion slidably fitted in the bore of shaft 30, and a pin 338 fitted transversely in this flange portion passes through slots in the shaft 30 to engage governor links 339. Washers 340 and the links 339 are retained by lock rings 341. Like pins, washers and lock rings are used at the mid-pivot points of the governor, and tubular fly-ball weights 342 are retained by the pins 338 passing therethrough. At the fixed end of the governor linkage, headed pins 343 pivot the ends of links 339 and hold a bushing 344 in position. The governor quill 337 is slidably fitted in bushing 344, which serves to hold the upper end of the governor quill in alignment when the shafts 318 and 326 are not in place during assembly or service operations. A main governor quill spring 345 is seated against bushing 344 and presses downward on the flange of the main governor quill.

A displacement responsive member 346 is actuated vertically by the cam 34 on the washer 33 and is shown at its uppermost position in the drawings. It is slotted to pass pin 29 and a narrower extension of the slot provides clearance for pin 338 and is of sufficient length to permit pin 338 to rise to its uppermost position in operation. The member 346 has a cylindrical upper portion forming a fluid sealing sliding fit in the bore of quill 337 and a smaller diameter upper extension upon which rests a modifier 347 which is slidably fitted inside top quill 335. A check valve 348 seats on the top end of modifier 347 and is also slidably fitted in quill 335 and a spring 349 seats to check valve, and in turn presses downward on the modifier 347. A spring lock ring 350 retains the modifier 347 in sub-assembly handling, and the spline teeth inside the lower end of shaft 326 similarly serve to retain the pop quill 335. A spring lock ring 351 is also provided to retain the quill shaft 318 in sub-assembly handling.

Below the lower flange of governor quill 337 an extension on one side thereof (Figs. 2 and 20) fits between small extensions on the upper boss of link 27 to force assembly of quill 337 in proper relation to the link, and a key 352 insures proper angular relation between the governor quill 337 and the shaft 30 in assembly.

The shaft 30 is mounted on ball-bearings 353 and 354, which are suitably fitted in a central bore in the cylinder block 2. A spacer 355, slidably fitted in the cylinder block separates the outer races of these bearings. The bearings are retained and suitably pre-loaded by a nut 356, locked in position by a lock wire 357. A cylinder head casting 358 has a shallow central counterbore in which a pilot ring 360 is snugly fitted, bearing against an interrupted shoulder 359 in the head casting. The ring 360 is slidably fitted in the cylinder block 2, and below the bearing 353 a load spreader 361, and a strong waved washer spring 362 rest on a shoulder 363 in the cylinder block. The spring 362 is so proportioned as to only compress a very small fraction of an inch under the full compression load applied by the gas pressure on the pistons through the link 27, pin 29, shaft 30, bearing 354, spacer 355, and outer race of bearing 353 to the load spreader 361, and the various parts are so proportioned that when cylinder head gasket 364 is compressed a minimum amount satisfactory for sealing purposes the spring 362 is deflected sufficiently to carry this load, but has additional deflection capacity to handle such additional compression of gasket 364 as may take place, as well as such variations in the dimensions of parts as may necessarily occur in their manufacture. This construction serves the very important purpose of maintaining a predetermined clearance between the cylinder head 358, and the top of pistons 3 when the pistons are in their respective uppermost positions, under variations in the compression of gasket 364, since as this gasket is compressed the entire bearing assembly supporting the shaft 30 is thereby slightly lowered, lowering the pin 29 and link 27, thus lowering the lower link pin 28 and the extreme upper positions of the piston and rod assemblies.

The upper end of shaft 30 has an integral spiral bevel gear 365, which meshes with an accessory drive spiral bevel gear 366 (Fig. 14). The above described construction also serves to maintain a constant mesh condition for these gears as the gasket 364 is compressed, yet it allows the head casting 358 and various parts assembled thereto to be removed without removing the shaft 30 or its mountings or related parts.

The bevel gear 366 is splined to an accessory drive shaft 367 and is held against a shoulder thereon by nut 368 with lock means 369. A ball bearing 370 is mounted on the hub of the gear 366 and supported in a bore in head casting 358, which also has an extension supporting a ball bearing 371 which forms a second bearing support for the shaft 367. A bushing 372 between the two bearings, is bored for a free running fit on shaft 367 and has a groove in its outer surface forming the aforementioned passage 242. Between the bushing 372 and the bearing 370 the shaft 367 is a free running fit in cylinder head casting 358. A drain passage 373 is provided to drain any excess oil out of this running clearance into an oil drain passage 374 in cylinder block 2. There are six other oil drain passages 374 as seen in Figs. 14 and 17, and the tops of these passages form the interruptions in the shoulder 359.

Beyond the ball bearing 371, a suitable oil seal 375 is mounted in the same extension of head casting 358 and seals against the shaft 367, which has mounted on its outside end a pulley 376 and a fan 377, both driven by a key 378, and retained by a nut 379 and lock means 380. An oil drain port 381 drains out oil above a suitable level for lubrication of bearing 371 and a passage 382 connects with a passage 383 in the cylinder block to drain this oil into the space below the cylinder block.

A belt 384 drives a water pump 385 and a generator 386 (Fig. 1) through pulleys 387 and 388. The water pump is connected by a pipe 389 to the bottom of a radiator 390 and delivers cooled water from the radiator through a pipe 391 to the lower part of the cylinder block 2. The water travels upward in the cylinder block around liners 3 and cools these as well as the oil flowing downward in passages 374. Passages 392 and 393, through the top of cylinder block 2, gasket 364 and the bottom walls of cylinder head casting 358, allow passage of water from the cylinder block to the interconnected water spaces in head casting 358, which convey water around the various head parts to passages 394 and 395 which cut through the top wall of cylinder head 358 and the lower wall of a head cover casting 396 as well as a gasket 397 which separates these two parts and seals the joint therebetween. Passages 398 in head cover casting 396 interconnect all the passages 394 and 395, and place these in communication with the water outlet passage 399. A water temperature control thermostat 400 and gasket 401 are clamped under water outlet fitting 402 which is connected by a tube 403 to the top of the radiator 390.

The cam rotor 310 has an inlet cam track 404 and above this an exhaust cam track 405. The section shown in Fig. 22 cuts the inlet cam track and shows four inlet cams equally spaced about the periphery on track 404 and integral with cam rotor 310. Cam followers 406 carry rollers 407 rotatably mounted on pins 408 and actuate transfer followers 409 which are rockably mounted on pins 410. The followers 406 have bifurcated ends also rockably mounted on pins 410 above and below the transfer followers 409. The actuating contact surfaces between followers 406 and transfer followers 409 are involute curved as in standard gear practice to insure equi-angular movements of cam followers and transfer followers. Like pistons 411 slidably fitted in a ring shaped part 412 are operated by the followers 406 and 409 and when any one roller 407 is operated by any one of the cams the adjacent pair of pistons is operated in unison by the followers. Valve pistons 413 are operated by the movements of pistons 411 through the medium of oil in the passages shown in Fig. 23.

Passages 412a in part 412 are partly uncovered when the pistons 411 are at their extreme inward positions as shown in Fig. 23 which occurs when the operating roller is riding a midportion of the dwell between cams. This dwell portion is not exactly concentric with the axis of cam rotor 310, but rather is offset slightly therefrom to have a distinct low point at an intermediate point on the dwell. This permits the pistons to completely cover the ends of the said passages 412a as the rollers ride toward the end of the dwell, so that no escape port is open when the rollers start up the actual cam rise, but in the dwell interval any leakage which may have occurred on the previous cycle is replenished, since passages 412a in part 412 are kept full of oil supplied from chamber 301.

The low points of the dwells of cam tracks 404 and 405 are made to approximately coincide so that simultaneous replenishment of the exhaust and inlet valve operating oil passages is made through the discontinuous sections of the passages 412a which also serve to purge air from the valve operating passages. Springs 414 urge pistons 411 toward their innermost positions taking up any existing slack in the mechanism between the pistons and the cam track and providing suction to assist the flow of replenishing oil. Ports 413a in pistons 413 are provided to exhaust excess oil if the working chambers above mentioned should become over filled in any way such as to tend to cause the pistons 413 to make a downward movement beyond the normal extreme down position which also would likely be accompanied by or caused by the piston 413 not rising to its normal extreme upper position.

Inlet valves 416 and exhaust valves 417 are actuated by pistons 413 in suitably timed motions governed by the shape and positions of the cams on cam rotor 310, suitable proportioning and positioning of which will be well understood by those skilled in the art. Springs 415 prevent slack between valve pistons 413 and the stems of the valves.

Exhaust ports 418 are provided for each cylinder, each port serving the two exhaust valves of each cylinder and conveying exhaust gases to a suitable exhaust manifold 419.

An annular inlet manifold chamber 420 interconnects all the inlet valves, and through passages 421, 422, and 423 communicates with an annular passage 424 in inlet manifold casting 425 which has an air horn 426 (Fig. 2) in which a throttle valve 427 is pivoted on pin 428 and operated by any suitable or known mechanism, preferably by the usual foot operated means if the engine is used in a vehicle.

Studs 429 and nuts 430 (Fig. 14) hold the central portion of heated casting 358 to cylinder block casting 2, and studs 431 and nuts 432 (Fig. 1) hold the head cover casting 396 and the outer portion of head casting 358 to cylinder block 2. Cap screws 433 with lock washers 434 hold the intake manifold 425 to head cover 396 and thereby retain casting 304 seated in its taper seat in head cover 396. Pins 435 hold casting 304 in proper angular relation through the relation established by the cap screws 433. Cap screws 436 and lock washers 437 retain cap 330 to casting 304.

The quill shaft 311 has eight equally spaced ports (Fig. 18) four of which are interconnected outside the distributor rotor and communicate with the passages cored in cap 330 which are supplied with oil under a fixed moderate pressure regulated by the valve 71 and delivered through pipe 80. These four ports act as inlet ports. Between each of the inlet ports is an exhaust port, and the four exhaust ports register with four closed passages 438 (Fig. 21) in rotor 307 which pass exhausted oil downward where it enters and passes through openings 439 in cam rotor 310. There are four ports 440 in shaft 326 which alternately register simultaneously with the four inlet ports then the four exhaust ports. When the inlet ports open, oil passes in through four slots 441 cut in the upper end of bushing 334 and in registry with the ports 440. This oil lifts accumulator-multiplier 333 against the pressure of spring 332. As the accumulator-multiplier 333 approaches its extreme upper position, passages 442 are uncovered at their inner ends and act as replenishing passages keeping an annular chamber 444 under multiplier 333 filled with oil. Simultaneously ports 443 are partly uncovered by the lift of multiplier 333, outletting the lifting oil to check its lift before it strikes the lower end of plug 327. As soon as the inlet ports close, the exhaust ports open, giving a free outlet for the oil under the head of multiplier 333 so that, except for the force required for acceleration, all the force applied by spring 332 is applied to the oil in chamber 444 ejecting this oil through ports 445 into annular chamber 446 and then through one of the passages in distributor rotor 307 and one of the contact pieces 308 into which ever distributor port is in registry. This furnishes oil at an intermediate pressure to the proper injector to operate the injector multiplier piston 274—274'.

The accumulator-multiplier piston 333 supplies power for one injection for each down stroke it takes, so an injection for one of the cylinders is supplied each time the oil exhaust ports are uncovered by ports 440. Since shaft 326 rotates eight revolutions for one revolution of the quill shaft 311 carrying the exhaust ports, shaft 326 takes seven revolutions in relation to the quill shaft in eight revolutions of the engine. Since four injection power pulses are produced for each revolution of shaft 326 in relation to quill shaft 311, twenty-eight power pulses are delivered in eight revolutions of the engine. This is the required number, since a seven cylinder engine of four cycle type requires three and one-half injections per revolution or twenty-eight in eight revolutions.

The distributor rotor 307 having four discharge passages equally spaced (Fig. 18) and passing through contact pieces 308, rotates at one-eighth engine speed and thus while the engine turns two-sevenths of a revolution the distributor rotor turns one-twenty-eighth revolution. This exactly aligns the passage through the one of the pieces 308 which is 90 degrees in advance with the port 305 connected to the next injector due to fire, which is two-sevenths revolution beyond the last one to fire. The cylinder in between which passes top center of its cycle during this interval is on its inlet and discharge stroke. The firing order with the cylinders numbered progressively in a circle is 1—3—5—7—2—4—6 when the numbering is done in the same direction as the engine shaft turns.

The four cams on each track on cam rotor 310 (Fig. 22) operate seven rollers bearing on each track in the proper sequence to accord with this firing order in the same way as the four ports in distributor rotor 307 register in proper sequence with the seven ports 305 in distributor ring 306.

The springs 275—275' of the injectors are so proportioned as not to permit the injector multiplier pistons 274—274' to be moved away from the upper stops by application of the pressure prevailing in supply pipe 80, so regardless of flow through passages 442 no down movement of the injector multipler pistons occurs until the ports 440 register with the exhaust ports in quill shaft 311. Similarly the pressure in chamber 444 generated by the force of spring 332 is sufficient so that no upward movement of pistons 274—274' (except that permitted by such leakage as may occur) takes place until the inlet ports in shaft 311 are opened to ports 440 admitting oil to lift accumulator-multiplier 333. The pressure of springs 275—275' is then sufficient to cause the pistons 274—274' and the intervening oil column to closely follow-up the return of multiplier 333, without any tendency for voids to be created.

The accumulator piston 331 is provided to accept oil during the down strokes of accumulator-multiplier 333, and to yield oil under pressure during the upstrokes, thus serving to keep the flow rate in pipe 80 substantially constant and avoiding creation of surge pressures which, at certain near resonant speeds, would disturb uniform action of the accumulator-multiplier 333.

The area of piston 331 is proportioned in relation to spring 332 and the working pressure in the pipe 80 so that it does not normally contact its upper stop, and ports 447 are provided to release pressure at a suitable down position so that excess downward movements are checked by the release of pressure when said ports are uncovered. In this way the piston 331 and ports 447 may serve as an auxiliary relief valve supplementing the action of valve 71 to maintain a pressure in the chambers at the upper end of pipe 80 just slightly less than the pressure maintained at the lower end of pipe 80 by the action of valve 71.

The ports 443, in addition to relieving the lifting force under the multiplier 333 as it nears the upper limit of its stroke, also keep the chamber in which spring 332 operates free from excess oil, since leakage oil is discharged through these ports by action of centrifugal force. Oil here discharged passes through bearing 325 which is thus lubricated and this oil is in turn thrown out by this bearing without any quantity accumulating and discharges into passages 448 (Fig. 16) which also receive oil from the ports 447 and drain this oil through the passages 448 into the upper oil reserve space 301.

Ports 449 which are provided in pop quill 335 act to stop injection (by dropping pressure in chamber 444 to a point where the injector pistons 274—274' do not move away from their upper stops) when the limiting speed of the engine has been reached. At this speed the lift of governor pin 338 has carried the governor quill 337 and the pop quill 335 upward to a point where ports 449 are above the top of modifier 347 thus outletting oil from chamber 444 and lifting check valve 348 to allow this oil to flow through modifier 347 and ports 450 then through the annular space inside pop quill 335 to expose its lower end area to this oil pressure. A few additional strokes of multiplier 333 then add to this oil, since check valve 348 closes against back flow and chamber 444 is replenished by passages 442. The additional oil thus delivered carries the pop quill upward to a point where ports 451 and groove 452 exhaust oil out over the top of governor quill 337 and out through ports 453 and 454. At this time the flange on pop quill 335 is above the ports 453 permitting direct communication between ports 451 and 453.

The "pop" action of pop quill 335 thus brought about serves to prevent resumption of injection until the engine speed has been markedly reduced, the extent of the reduction being governed by suitably proportioning the various parts, particularly the pop quill 335 and the relative strength of the springs 336 and 345. By suitably proportioning these parts the engine speed can be sufficiently reduced to bring about any desired effect that can be produced by reduction of engine speed.

The engine speed at which the described governor action takes place is modified according to the displacement being used by means of modifier 347, displacement responsive member 346, and cam 34. The shape and position of cam 34 is such that as pin 35 is lowered to increase displacement the member 346 is also lowered. This lowers the top of modifier 347 to allow the ports 449 to open when the engine is at a predetermined suitably lower speed and the governor quill 337 and pop quill 335 are not as high as when pop action takes place at a lower value of displacement and higher speed.

When injection is resumed by lowering of the engine speed and resulting lowering of the governor mechanism until ports 449 are again covered by modifier 347, the orifice passage in the center of the top of pop quill 335 gradually exhausts oil from the interior to allow the pop quill to slowly reseat itself on top of the main governor quill 337, as urged by spring 336. This orifice passage is not large enough to interfere with lifting by the pumping action described.

Fig. 27 shows (to a larger scale) additional details of the constant angular velocity universal joint, as seen in this section taken along line 27—27 of Fig. 2. In a universal joint of this general character it is necessary to have the plane of the center lines of the balls exactly bisect the angle between the two shafts (in this case the angle between the axis X—Y and the main axis of the engine) in order to attain correct geometry and to avoid setting up high internal strains between various parts of the universal joint tending toward its rapid destruction.

This necessity is formed by the fact that the center lines of raceways 9a and 12a always cross in a plane bisecting the angle between the two axes, but there is also a strong tendency for the plane of the ball centers to take too large an angle in relation to a plane square with the main axis of the member having the inner races 12a and too small an angle in relation to a plane square with the main axis of the member carrying races 9a. This is caused by the rolling action of the balls and may be most easily visualized by considering the plane of the balls as holding a fixed position and each axis tilting to an angle in respect thereto. It is then seen that rolling of the balls 20 as the axes move away from parallelism as accompanied by greater angular movement of the inner races 12a than the outer races 9a if the races have like contours and like contact points on the balls, since the radius of races 9a is larger than the radius of races 12a. This causes noticeable forced sliding rather than true rolling of the ball and race contacts, or if these are fitted rather tightly, as they should be for best results, then the rolling action strongly urges the plane of the balls out of true position setting up severe internal stresses due to conflict of this tendency with the requirements set up by the crossing centerlines of the raceways.

To avoid this difficulty and turn these forces into united action tending to hold correct geometry, the raceways 12a are slotted wider than the raceways 9a so that the radius of contact from the rolling axis of each ball as seen in Fig. 27 is larger from the ball axis to the outer race contact points than from the ball axis to the points of contact on the inner races. This is made to be in direct proportion to the ratio between the points of contact on the races as referred to the main center lines of the raceway members. In this way rolling action of the balls is made to confirm and assist rather than oppose the plane of the balls 20 being held at an angle exactly bisecting the angle formed between the two shafts. True rolling action thus replaces a mixture of some rolling and some forced sliding at the points of principal contact and highest pressure and the tendency of tightly fitted balls and races to set up conflicting motions and unnecessary internal pressures is completely avoided, bringing about reduced friction, lower operating temperatures, larger load capacity and longer life.

While pistons shown in Figs. 2 and 17 are of conventional type, the other features of this engine make particularly applicable and useful several novel features of piston and piston ring construction.

Details applying to each of the piston assemblies are shown in Figs. 28 to 33 inclusive. Each piston 4 is built up from a head sheet 4a of stainless steel or other highly oxidation resistant alloy, a pressure plate 4b, a center support member 4c, a rim support member 4d, a tubular central member 4e and a waisted skirt member 4f all welded or otherwise metallically fused together with an insulator 455 of mica or other suitable insulating material hermetically sealed inside of parts 4a and 4b.

Parts 4b and 4d are machined to suitably fit the piston ring 5 and an expander-sealer 456 which cooperate to seal the piston more completely than three or four rings of ordinary type. This is because ordinary rings, even if step cut, allow a considerable leakage path at the joints unless the joints also butt up tight which is a condition that is impossible to maintain due to temperature variations and wear. Pressure above the ring simply passes through the upper gap of a step cut ring, then behind the ring and out the lower gap. Consequently even several rings fail to seal tightly, especially when the gaps are large as at low temperatures or when rings are worn.

When pistons are on their compression or expansion strokes a lower surface of any compression sealing ring normally rests tightly against a supporting surface of the piston and is held there by gas pressure which seeps in above the ring to a considerable extent, sufficient to close up the clearance on the supporting surface. This becomes the principal sealing surface in addition to the contact surface of the ring with the cylinder wall, and these surfaces when properly fitted and finished adequately seal except at the gaps at the ring joint.

Figure 30:
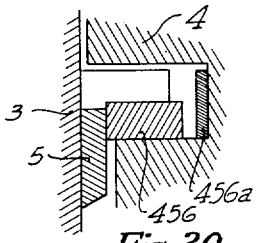
Figure 31:
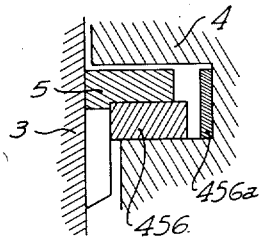
Figure 32:
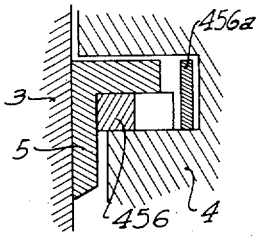
Figure 33:
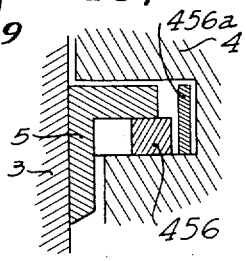

The ring 5 in cooperation with the expander-sealer 456 effectively seals also at the gaps. Pressure gets behind the ring as usual as seen in Fig. 30, which is a section through the upper gap of the step joint of ring 5. However pressure behind and above the ring is prevented from escaping at all points. The lower gap of the joint in ring 5 as seen in Fig. 31 gives no escape path since the upper and lower faces of expander-sealer 456 are sealed by close contact caused by pressure of gas above the ring 5. A vertically cut step joint is provided in expander-sealer 456 and shown in Figs. 29, 32, and 33. This allows suitable expansion for temperature changes or wear without allowing any leakage, since the overlap is made to fit snugly as in other step joint rings, and the portions of expander-sealer 456 which are not cut away at the gaps seal tightly on their top and bottom surfaces and do not leave any passage for gas. Thus the ring 5 in cooperation with the expander-sealer 456, the piston 4 and the cylinder wall, forms a completely tight seal under all conditions of expansion whether due to temperature changes or wear.

The lower portion of ring 5 extending below the lower face of sealer 456 serves to reduce or eliminate taper wear and other excess wear in the upper part of the ring travel by balancing that portion of outward pressure on the ring which is caused by gas or other fluid pressure in the groove behind the ring. The lower extension serves this purpose because with any ring the pressure above the piston causes a seepage pressure in the seal between the ring and the cylinder wall tending to force the ring inward. This seepage pressure drops gradually from the top to the bottom of the ring so that the average inward pressure is about half the maximum, while the maximum pressure is acting over the full area inside the ring, so with the usual ring the inside fluid pressure is half balanced but the remaining half is a serious pressure. With this ring the area exposed to full fluid pressure is proportioned to be about half as large as the seepage area under an average of one half the full pressure, so that the forces produced by these pressures are substantially balanced. By this means the pressure of the fluid above the piston has no appreciable effect on the pressure of the ring against the cylinder wall, so taper wear and excess top travel wear are largely eliminated.

In Fig. 29 a waved expander 456a is shown, which may, as a modification, take over the expanding function of part 456, simplifying its manufacture. The expander 456a then also serves to centralize the upper part of piston 4 in the cylinder bore which is particularly important with this waisted type of piston.

The completely sealing ring serves to lighten the piston assembly by permitting use of a single two piece ring and a single ring groove, thus also facilitating practical use of the piston construction shown in Fig. 28. This construction also cooperates well with the ball joint type of connecting rod employed in this invention, since the shapes of elements 4c and 4d are thus simple figures of revolution with hemispherical central domes forming a very suitable seat for the upper end of the connecting rod 6 and well arranged to transmit high gas pressures distributed over the pressure plate 4b to the upper end of rod 6 with a minimum weight of material.

The pistons 4 are retained on rods 6 by split shoes 457 which are held in sliding contact with the outer spherical surface of the upper cupped end of the rod by retainer 458 which is slipped over the rod before the split shoes are placed around the rod. The retainer 458 is then screwed into the threads provided in piston element 4e and locked by wire lock 459, closely fitted in a groove in the retainer 458.

A spiral bevel gear 460 (Fig. 5) is driven by the gear 43 and has an integral shaft 461 mounted on bearings 462 and 463 wsich are supported in casting 1. A starter gear 464 is splined to shaft 461 and the inner end of its hub bears against an oil slinger 465 and applies pressure therethrough to suitably preload the bearings 462 and 463. A nut 466 and lock 467 retain gear 464 in position. The inside boss of the bulb of gear 464 is smoothly finished on its outer diameter for rotation in an oil seal 468 mounted in base casting 1. The outer side of gear 464 is provided with a face 469 to which a suitable clutch or shaft flange may be attached to receive the power output of the engine.

A starter pinion 470 is integral with a shaft 471 and is driven by a quill 472 to which it is coupled by slidable splines 473. A starter 474, with a shaft 475 also splined in the quill shaft 472, drives the pinion 470. Oil seal 476 has a plate 477 which serves to retain quill shaft 472 in position with its opposite end bearing on a thrust washer 478. A pinion cylinder 479 is mounted in and shouldered againt the base casting 1 and has a bore in which the shaft 471 is rotatably and slidably mounted. The shaft 471 has formed thereon a piston 480 adjacent pinion 470 which is similarly fitted in a counterbore in the cylinder 479. A valve 481 is slidably fitted in a bore in shaft 471. An auxiliary shaft 482 has an extension fitted in this bore and retains the valve 481. The shaft 482 has a larger diameter portion press fitted into a counterbore in the end of shaft 471 and rotatably and slidably supported in a blind bushing 483. A spring 484 is seated in the closed end of this bushing and its active end bears against the bottom of a bore formed in the end of shaft 482, and thus holds the pinion 470 normally out of mesh with the gear 464.

The valve 481 has chamfers at its ends forming poppet type seals against seats formed in shaft 471 and the small end of shaft 482. A passage 485 in shaft 482 communicates through the ports and passages shown with an annular chamber 486 which serves to admit and exhaust oil to actaute piston 480. When valve 481 is at the position shown, its end chamfer is in sealing engagement with the end of shaft 482, so that passage 485 is closed off from an annular chamber 487 which would otherwise be in fluid communication therewith through the ports and passages shown. The valve 481 is held firmly in this position when the engine is in operation, by oil entering a chamber 471b from an annular chamber 488 which is kept under pressure by communicating with chamber 17 through a passage 489 (Fig. 2) and one pair of the passages 77 which are formed in the extensions 13a on the annular piston 13.

The valve 481 has a full diameter central portion and a slightly smaller diameter at each end between the chamber and the central portion. These smaller diameters are so proportioned that the area of the shoulder is, for example, one-eighth of the full end area of the valve. With the valve in the position shown the area exposed to the pressure in chamber 488 is then eight times as large as that exposed to any pressure of oil in chamber 487, so that it would require a pressure in chamber 487 of eight times the pressure carried in chamber 17 to unseat the valve 481. Similarly, when the valve is at the opposite end of its travel while starting the engine, the other end-chamfer seals off chamber 471b. Pressure in chamber 488 which is the same as in chamber 17, may then rise toward normal running pressure during starting of the engine, but could not unseat the valve even against a pressure in chamber 487 as light as one-eighth as much as carried in chamber 17. To insure that this condition will not be upset by leakage, a vent orifice 471a is provided to prevent build up of pressure in chamber 471b while the starter is being operated. This allows leakage to escape through slots 479a in the end of cylinder 479. The orifice 471a is exposed to the pressure in chamber 17 when the engine is running but has a sufficient flow resistance to prevent serious drain on the oil in chamber 17.

Figure 4:
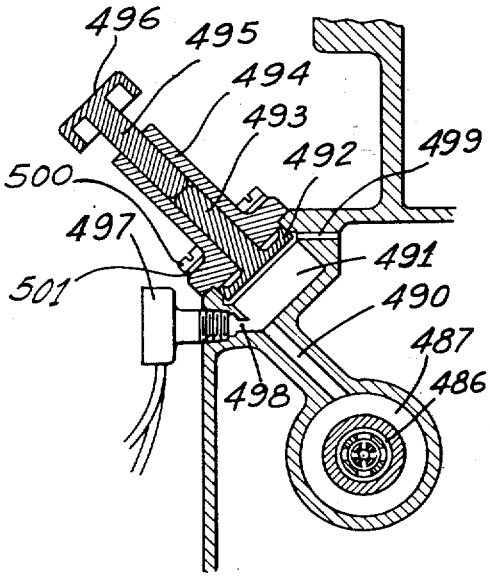
Fig. 4 is a partial vertical section through the lower portion of the mechanism as indicated by line 4—4 on Fig. 3.

The chamber 487 communicates through passage 490 with a cylinder 491 in base casting 1 (Fig. 4). A piston 492 is slidably fitted therein and has a stem 493 slidably fitted in a cylinder cap and guide member 494. A push rod 495 with an integral button 496 is also slidably fitted in guide member 494, and serves to actuate piston 492.

The cylinder 491 is kept filled with oil by leakage past the body portion of valve 481 from chamber 488 into chamber 487, and excess leakage passes out through a port passage 499 which is so positioned as to be covered by the piston 492 as it starts its active stroke. This passage also keeps cylinder 491 cleared of air at all times. The guide member 494 is piloted in cylinder 491 by a small extension fitted therein and is retained in position by cap screws 500 and lock washers 501.

When the button 496 is depressed (if the engine is not running) the piston 492 discharges oil into chamber 487 which freely moves valve 481 away from the position shown, since there is then no pressure in chamber 17. This movement continues until the valve 481 is seated at the opposite end, then pressure builds up on piston 480 to overcome spring 484 and engage pinion 470. When the pinion is fully engaged against the head of bushing 483, further build up of pressure actuates a hydraulically operated switch 497 through oil passed from cylinder 491 through a passage 490.

The switch 497 operates the starting motor by standard means well known in the art. The starting motor does not ordinarily operate until the pinion is fully meshed as described, but in case the gear 469 and pinion 470 should be stopped in such positions as to block meshing, the starting motor will receive a flash of current sufficient to rotate pinion 479 slightly. This will then permit engagement to start, which will drop the pressure applied to switch 497 to break the circuit momentarily until the engagement of pinion 470 is completed.

The pinion 470 can be kept in mesh until the engine is running smoothly since even through full normal pressure builds up in chamber 17 it is unable to move valve 481, since the pressure in chamber 486 caused by the spring 484 is strong enought to prevent this until it is dropped by return of piston 380 to its stop. When the pressure in chamber 487 resulting from pressure in chamber 486 or force applied to button 496 drops to one-eighth of that carried in chamber 17, the valve 481 then moves back to the position shown. It then requires eight times as much pressure as carried in chamber 17 to disturb the valve or actuate piston 480 to engage the pinion. This is an overall pressure ratio of 64 to 1 so it is apparent that by proportioning the valve 481 as described a very moderate force may actuate button 496 when the engine is stopped, but it is impossible to operate same with any reasonable force when the engine is running, thus preventing accidental meshing of gear 469 and pinion 470 while the engine is running.

The engine may be stopped by simply cutting off the fuel flow in pipe line 124. This stops application of pressure by ball 206 in the fuel control box causing the pressures in passages 241 and 244 to become equal and substantially zero, thus stopping all injection, but leaving the lines filled with fuel ready for the next start. A valve 502 serves this purpose.

OPERATION

While certain details of operation closely associated with the construction of the various parts of the engine have been given in connection with the detailed description of the parts, the operation of the complete engine may be most readily understood by the following description of its operation, given under various sub-titles for ready reference.

Power transmission and torque reaction structure

The tilt angle of the axis X—Y governs the tilting angle of the rocking member 9 and thereby the stroke of the pistons 4. The rocking member 9 is held from rotating by the balls 20 which, with their cooperating races, form a constant angular velocity universal joint which is non-rotating but carries the torque reaction which is transmitted through members 12 and 13 and the extensions 13a to the base casting 1 which has bores in which the extensions 13a are fitted. The rocking of member 9 transmits the power developed by the pistons through the bearings 21 to the flywheel 24. Power is taken off through the connected elements 31, 35, and 37 to the shaft 41 which carries the power delivered by the engine; and through elements 27, 28, and 29 to shaft 30 which conveys power for operation of valves, governor, timer, fan and other accessories.

Variable displacement control

The tilt angle of the axis X—Y, the stroke of the pistons, and the displacement of the engine are varied by raising or lowering of the pin 35 by admitting oil under pressure to chamber 17 to decrease displacement or outletting oil therefrom to increase it. The pressure applied to the oil in chamber 17 depends on the mean working pressure of the air and gases above the pistons, so that rapidly outletting oil from chamber 17 when a suitable oil pressure is exceeded causes the displacement to increase very quickly whenever the mean working pressure is above normal. Whenever the mean working pressure is below normal, the outlet valve is closed and the displacement is gradually decreased by oil continuously supplied at a limited rate. Principal control of displacement lies in the pressure governed outlet valve shown in the shell 135 in Fig. 2 and in detail in Fig. 7, the operation of which has been described in connection with the description of the parts thereof. This also covers operation at reduced mean working pressures when atmospheric pressures are below normal due to high altitude operation.

Since the established mean working pressures are exceeded whenever the throttle is opened wide or the load on the engine tends to abnormally lower its speed, the displacement is rapidly increased to full value under such conditions. When running light, the displacement more slowly approaches minimum until it becomes most suitable to the load on the engine.

Increased compression ratio at minimum displacement

The arrangement of the displacement controlling elements is such that, with suitable proportioning, the compression ratio is caused to increase appreciably as the engine approaches minimum displacement. The engine is always placed on minimum displacement when stopped by action of the springs 76 and usually also by the fact that the engine assumes minimum displacement during idling before it is stopped. In starting the engine, the compression pressure may be considerably higher than normal without the normal mean working pressure being exceeded, so the engine stays on minimum displacement during starting and an ultra-high actual compression is maintained until the engine starts. Unduly high compression pressures are avoided when running at minimum displacement, since the engine only runs at minimum displacement when throttled sufficient to hold normal mean working pressure.

Static and dynamic balance

Static balance of this engine demands that the center of gravity of the entire rocking assembly plus the rotating tilted assembly be at the intersection of the axis of pin 35 with the axis of shaft 37. Allowance for the weights of the lower ends of the connecting rods and the lower end of link 27 must be included in this balance. The construction disclosed is particularly adaptable to attainment of this condition and it is substantially attained by the proportions shown. Attainment of this center of gravity naturally holds correct static balance for all angles of tilt.

It will of course be understood that the other rotating parts must be in balance, the piston and rod assemblies must be of equal weight and some other commonly known requirements satisfied. Also the upper end of link 27 may be balanced by added weight carried on the opposite side of shaft 30, such as the key 352 and its seat.

Rocking of member 9 accompanied by reciprocation of the pistons and rods introduces a dynamic unbalance couple. This is balanced by the couple created by rotation of the rim portion of flywheel 24 about the main axis of the engine while its geometric axis is tilted at an angle thereto. By suitably proportioning the flywheel 24 and attached parts rotating therewith in relation to the masses in the rocking and reciprocating parts, the entire mechanism may operate under full dynamic balance, and such a balance when established for any tilt angle, holds for all angles of tilt, except for very minor secondary unbalance factors associated with the angularity of the connecting rods. The maximum angularity of the rods is so small and the effect so well averaged-up by the seven cylinder construction that the secondary forces become very much smaller in relation to the fully balanced primary forces than in any well known type of engine.

It should be understood that the flywheel member 24 of itself has some portions (namely the hub, and the ribs and most of the disc connecting the hub to the rim) which contribute to the unbalance couple while the rim portion surrounding the bearings 21, aided by the cap ring 25 and the outer races of the bearings 21, counterbalances the entire rocking assembly in addition to the unbalance effects above mentioned. The proportions shown substantially attain such a balance.

Dynamic and gas pressure couples balanced

The couple load which the aforementioned dynamic couples would cause to be transmitted through the bearings 21 if the engine were operated without gas pressures on the pistons is more than balanced by a pair of couples in the opposite direction caused by the eccentricity of the point of application of the gas pressure loads, except at the highest engine speeds. At a moderately high speed a fully balanced condition is attained and the dynamic couple caused by the reciprocating and rocking members is equal to the opposed static couple caused by eccentric application of the forces applied to the pistons by gas pressures. Also the dynamic couple created by the flywheel 24 and attached parts is balanced by the opposed couple created by the eccentric application of these same gas pressure forces to the cylinder head and transmitted through the head, cylinder block, the shaft 30 and its bearings and the link 27 to the flywheel. Thus at a certain "balance" speed the bearings 21 are relieved of couple loading.

There is one such balance speed at full displacement and a series of progressively higher balance speeds as the displacement is reduced.

At speeds above any of the above described balance speeds, the dynamic couples exceed the gas pressure couples and the unbalanced portion of the opposed dynamic couples becomes a couple load on bearings 21, while at very low speeds the dynamic couples become negligible and the opposed gas pressure couples are carried through and become a couple load on bearings 21 (in the opposite direction to the dynamic couple load).

These various balanced couple conditions always permit the gas pressure thrust load to be in part centrally applied and transmitted from member 18 to member 12b at low rubbing speed through the spherical bearing surfaces, and the remaining thrust load to be carried by the upper bearing 354 of shaft 30.

Low friction losses

The use of antifriction bearings at all points on the full speed rotating members, the very low rubbing speeds in effect in the ball joints, the low piston to cylinder friction gained by very low connecting rod angularity, and the low piston ring friction attained by the special ring construction described, each materially contributes to reduced frictional losses and the combined effect is such as to make a marked reduction in total friction losses that is particularly apparent in reduced low temperature starting drag. Antifriction bearings have not attained any widespread use on principal bearings of internal combustion engines on account of assembly difficulties and high peak loads in relation to average loads. The construction of this engine wherein the anti-friction bearings carry combined loads of a number of cylinders, causes the peak loads to be not much greater than the average loads and assembly is facilitated by the construction provided, so that the use of antifriction bearings is here practical while not generally practical as to the principal bearings of usual type of internal combustion engine.

High pressure operation

The low friction losses are well maintained under extra high gas pressures in the cylinders. This combined with the short tubular connecting rods operating at low transverse accelerations and the high rigidity and strength of other parts, particularly the freedom from deflection in the cylinder block and base due to close grouping of the cylinders, make this engine unusually suited to high pressure operation such as required for use of ultra-high compression fuels such as triptane, or such as to permit fully adequate compression to secure easy starting and complete combustion when operated as a compression ignition engine, even when using fuel of low ignition quality. It should be also noted that the various ball joint bearings operate with unimpaired efficiency and durability even if forced out of normal alignment by deflections resulting from extra high cylinder pressures. A further safety factor in high pressure operation is provided by the displacement control means, since if for any reason (such as accumulation of carbon deposits for instance) the mean working pressure on the pistons tends to exceed the predetermined normal value, this pressure is reduced by the resulting increase in engine displacement.

Higher speeds at low displacements

The aforementioned "balance" speed has a certain value at full engine displacement and the maximum safe engine speed at this displacement will generally not exceed a speed of 130 to 140 percent of the balance speed, due to dynamic couples increasing according to the squire of the speed. However when the engine is operated at reduced displacement the balance speed increases. In the proportions shown, the minimum displacement is one-third of the maximum and at this displacement the balance speed becomes substantially the square root of three times the full displacement balance speed and accordingly the safe maximum speed becomes approximately the square root of three or 1.73 times the safe maximum speed at full displacement. Speeds above referred to apply primarily to the principal working parts of the engine involved in the explanation of "Dynamic and gas pressure couple balance." To fully utilize the increased speed permitted by the above factors has required provision of valve and injector operating mechanisms capable of enduring and satisfactory operation at the higher speeds.

Valve operation mechanism

To operate the usual valve mechanism at the speeds above described would require three times the operating force, and would call for three times the spring pressure. The increased spring weight would increase the masses to be handled enough to make even the three to one force factor quite inadequate. It has required a combination of important improvement factors to make enduring and satisfactory operation possible at these higher speeds.

The reduced engine displacement is considered sufficient in relation to the increased speed to make maintenance of the same port area adequate. The adoption of four valves per cylinder has made it possible to maintain this port area by using valves having seventy-one percent of the usual diameter and seventy-one percent of the usual lift. The reduction of head diameter permits correspondingly reduced head thickness, stem diameter, and stem length so that valve weight is reduced according to .71 cubed. This reduced weight, combined with reduced lift, permits reduction of operating force to .71 to the fourth power or to 25% at the same engine speed, or to 50% at a speed 1.41 times as great. At such speed a force of one-half the former value is applied to one-half the former area so that the unit pressure is the same and the life the same number of cycles or 71% of the former number of hours.

It is thus evident that use of four valves per cylinder is a substantial help, but not sufficient to permit normal endurance even at 1.41 times the former speed. However most of the operation will be at more than minimum displacement and therefore less than maximum speed so it may be considered that this feature would permit a fully satisfactory life if the maximum speed were to be only 1.41 instead of 1.73 or the square root of three times normal.

A substantial part of the weight which the valve cam and valve spring are called upon to handle is in the mechanism between the stem end and the cam, which in this engine has been reduced by employing oil rather than metal as the medium of force transfer, using light weight cup pistons at each end of the oil column. This means also serves as a hydraulic slack adjuster so that needless punishment of the valve mechanism due to back-lash is avoided. Definite evaluation of the extent of gains available by these features is difficult, but it is believed that they afford enough improvement to permit sufficiently enduring operation at the 1.73 speed ratio to cover such operation as may occur at that speed, and to give a very nice reduction in punishment when operating at normal speeds. The valve operating mechanism disclosed also appears to be considerably quieter and cheaper to manufacture than any other means of operating vertical stems from a vertical cam rotor would be.

Fuel injection principles

A new system employing certain very old features and combining certain new conceptions is here applied in such a way as is believed may inaugurate new standards of performance for fuel injection engines.

The quantity of fuel for each injection is determined by the metering pressure maintained in the fuel control system supplying the injectors. This governs the metering of fuel by each injector in a manner practically independent of engine speed, leakage, nozzle conditions and all other factors which commonly interfere with accuracy and uniformity of injection quantity. The metered quantity of fuel is subsequently discharged from each injector by a system of high speed hydraulic pressure multiplication at high injection pressure through an outwardly opening nozzle valve. The injection of a full fuel charge may occur in less than .001 second at high engine speeds in .003 second or less at cranking speeds.

Fuel control system

The fuel control system comprises means for regulating the metering pressure in accordance with the weight of each air charge as determined by the factors of cylinder displacement, inlet manifold absolute pressure, and the effect of temperature on the weight of a given volume of air at a certain pressure. The metering pressure is held basically proportional to the product of these three factors by definite means holding this basic set up over the entire range of variations of all three factors except for such modifications as may be deliberately introduced.

The operation of the fuel control system may be divided into two sections, the operation of the fuel pump, which delivers at a pressure regulated in direct proportion to cylinder displacement, and the fuel control box which takes proper account of absolute manifold pressure and temperature so that the metering pressure at which fuel is delivered from the fuel control box provides a true measure of the quantity of fuel required for each injection to produce the proper air/fuel ratio.

Fuel pump operation

This pump (Fig. 8) is operated by an evenly timed series of oil pulses in duct 93. The pressure of these pulses is regulated by the valve 81 and associated parts and the oil pulse duct 93 is alternately supplied with oil under pressure from valve 81, then connected to atmospheric pressure to allow a return of the oil as has been described. (Reference numerals 81 to 95.) Oil pressure in this duct acts on the outside of bellows 102 to compress same and thus reduce the interior volume. Fuel enters the pump through pipe 98 and soft synthetic rubber tube 99 and goes to an annular space above the outer portion of valve plate 107. A suction valve 106 admits fuel to the interior of bellows 102 through ports in the valve plate when the bellows expands. The suction valve is then closed by spring 105 and the next pressure phase of the oil pulse compresses the bellows and forces the fuel up through apertures in the valve plate, lifting pump discharge valve 108 and forcing fuel into the space around the upper bellows 109 which is gas filled at a suitable pressure to act as an accumulator particularly suited to high speed pulse absorption due to its low weight in relation to its absorption capacity.

Fuel is discharged from this space through ports shown, lifting an accumulator discharge check valve 121, which serves primarily to prevent back flow into the accumulator thus resisting any tendency for unexpected oscillations of bellows 109 to be set up if resonant conditions should occur in the discharge line under certain operating conditions.

The pressure in bellows 109 is such that it does not contact stop 113 except when the engine is stopped, and both bellows are of such size in relation to the fuel delivery per cycle that the movement is normally only a very small fraction of an inch, and under some operating conditions merely a few thousandths. The bellows 102 is shown at substantially its free position while stop 120 is provided to limit its stroke to somewhat less than safe maximum. In steady operation this end of the bellows takes its very short stroke at a point between the stop positions, where the stiffness of this bellows is sufficient to draw in the fuel while the pressure outside it is released. The inlet valve 106 and the spring 105 are light in weight and the pressure of the spring is just sufficient to return the valve with required speed. Any tendency to back flow of course assists quick seating of the valve at the expense of a slightly longer stroke of bellows 102. The flexible tube 99 is provided to act as an inlet accumulator, collapsing slightly during suction strokes to allow steady flow in pipe 98 and to eliminate the effect of the mass of fuel in pipe 98 on the acceleration and deceleration of flow through suction valve 106. The accumulator action of bellows 109 serves the same purpose in connection with acceleration and deceleration of fuel through the exhaust ports and valve.

The bellows 102 serves to keep the oil and fuel completely isolated and hydraulic operation of this bellows makes possible operation at delivery pressures that would be totally impossible with cam operation of a bellows or other thin flexible sealing member, since the pressures inside and outside the bellows are kept substantially equal at all times so that the pressure differences to which the bellows is subjected are relatively insignificant. Hydraulic operation of the bellows also accomplishes a very complete elimination of the destructive surge waves that are commonly set up in a bellows when high speed operation is attempted with one of the operating forces or reactions applied to the free end. In this pump such slight pressure differences as exist between the inside and outside pressures act simultaneously on all the convolutions thus avoiding the tendency to set up these surge waves within the bellows structure and satisfactory fatigue life may be realized at greatly increased operating frequencies. This applies to bellows 109 as well as 102.

Operation at short stroke and high pressure demands that the fuel pumping chamber be kept free of air or vapors, since the compression of even a small quantity of compressible medium would increase the stroke of bellows 102 in accordance with its change in volume as it became compressed. It may be noted that the working chamber of this pump is so arranged that any gases which may be present gather under the discharge valve by the flow and by the separating effects of gravity and are carried up into the accumulator space by the operation of the pump. Also the space outside of bellows 102 is kept free of air by the tendency for same to separate from the oil and gather in port 94 under the influence of gravity. Here a fine metering orifice drilled from port 94 through casting 1 as shown in Fig. 8 serves to purge out air without allowing sufficient flow of oil to interfere with proper operation.

The lifts of the valves as well as the strokes of the two bellows are very slight in normal operation and there is every indication that, with suitable proportioning, the construction shown is capable of satisfactory operation at pulse frequencies as high as 200 cycles per second, and that the delivery pressure can be maintained substantially equal to the pressure in effect in chamber 84 as controlled by valve 81, over the full range of fuel rates used in operation.

The pump is self regulating as to holding delivery pressure under variable volume of delivery, since when the outlet pressure equals the peak pressure reached in oil pulse duct 93 the stroke and delivery become zero, and within limits far beyond normal use rates the stroke automatically increases with the volume of fuel used. Since the oil pulse pressure is controlled and maintained proportional to engine displacement, the fuel delivery pressure is also proportional to engine displacement. A few slow cycles of full stroke between the stop 120 and the body 100 may occur in starting up the engine if the space inside bellows 102 has become empty or partly empty, which may occur if the fuel tank becomes empty or in case of replacement or dismantling of the fuel pump or the fuel lines.

Operation of fuel control box (Figs. 9 to 13 inclusive)

Fuel delivered from the pump at displacement controlled pressure enters duct 158 in the fuel control box and supplies the input port of a pressure regulating valve 162 which regulates the pressure in ports 166 and passage 167 in proportion to the pressure applied to the stem at its upper end.

This pressure is regulated by applying the pressure in duct 158 to a ball piston 206 which bears against one end of a rocker arm 210. The distance from the pivot point at which the pressure of the ball piston is applied is governed by the vacuum sealed bellows 192 as affected by manifold pressure surrounding it. At full sea-level pressure the ball bears on a point near the end of the rocker arm, and when absolute manifold pressure reaches half of standard pressure the ball may bear on a point half as far from the pivot point. A roller 211 bears on the other end of the rocker arm and its contact on the arm 210 is maintained at a radius proportional to absolute temperature by the action of a bimetallic thermally responsive element 216. It is now apparent that at a given temperature the downward force on roller 211 is proportional to the absolute manifold pressure times the displacement, as the force applied by the ball takes direct account of displacement through the pressure in duct 158. The temperature responsive element is basically proportioned so that the roller 211 is near its end of arm 210 at the maximum temperatures normally encountered in service and at half this radius when the absolute temperature is half as great. Thus the force applied to roller 211 through the pressure of ball 206 on rocker arm 210 becomes proportional to manifold pressure times displacement divided by absolute temperature, which is the desired result since the weight of air in a given volume at a given pressure is inversely proportional to the absolute temperature.

The force applied to roller 211 is transmitted to the top of pressure regulating valve 162 through lever 213 and pressure lever 219, so that the pressure maintained in valve outlet passage 167 is proportional to the product of the three factors determining the weight of air taken by each cylinder under the conditions prevailing at the moment. This is the metering pressure. It may be noted that all controlling is here done on a pressure basis, and since the supply is adequate, reasonable leakage has no effect on the pressure.

The under surfaces of the arm 210 are made arcuate where the ball 206 and the roller 211 travel, with the centers of the arcs so located that when the ball 206 and roller 211 travel over their ranges with the parts in normal position there is no tendency for the pressure applied by the ball to alter the action of bellows 192, or for the roller 211 to alter the action of bimetallic element 216. The departure of rocker arm 210 from its normal position is extremely slight since a few thousandths of an inch movement of valve 162 from its critical normal position produces a large increase or decrease in the fuel metering pressure, even at maximum fuel use rates. Since there is no pressure when the engine is stopped the thermal and manifold pressure responsive elements are entirely free to take up their cold and starting positions as the engine stands, thus are not inclined to be stuck in the wrong positions when cold starts are undertaken. The relatively large roller 211 and the free rolling of ball 206 on its hydraulic support pressure also insure free action.

It is perfectly feasible to modify the basic action of the thermally responsive element to enrich a cold engine, or to compensate for differences in temperature between the fuel control box and the air in the cylinders by suitable change of proportions, but it should not be overlooked that the full manifold pressure, and the low starting temperatures will of themselves give much increased injection on cold starts such that modification for better starting characteristics may be completely unnecessary.

The manifold pressure control may also be modified from the basically correct relationship in any way found desirable. The proportions may suitably be simply changed so that injection reduces to zero before manifold presure reduces to zero thus making the change in injection faster than proportional to the change in absolute manifold pressure. This may be accomplished by so proportioning bellows 192 and associated parts that the ball 206 reaches a zero radius on rocker arm 210 before the pressure around the bellows reaches absolute zero.

The valve 171 and its stem 172 operate as a proportional pressure valve and may be so proportioned as to maintain any desired portion of the pressure in passage 167 (metering pressure) in the auxiliary fuel passages connected to port 177. This pressure may be one-twentieth to one-fiftieth of the fuel metering pressure and is herein called the seal fuel pressure. It is used in the injectors to increase accuracy of metering and to prevent leakage of any of the metered quantity of fuel during injection. The seal fuel pressure is carried back to port 165 of the pressure regulating valve to cause the pressure in ports 166 to be held at the required value over and above the pressure in ports 165 to give more direct and accurate control since it is actually this difference that governs the injector metering, but proportionality is not altered since the seal fuel pressure is normally kept in proportion to the metering fuel pressure. However, any failure of valve 171—172 to operate normally is thus prevented from altering the effective fuel metering pressure.

The adjusting screw 226 serves to adjust the pressure of spring 224 on the arm 210 and is provided to adjust the minimum fuel metering presure to a certain minimum value to compensate for any initial pressure that the injectors may require to start metering, then to adjust the fuel air ratio in idling. Idling is always at minimum displacement; under higher manifold pressures and larger displacements the effect of this adjustment becomes negligible. Reference is here made to the description of the elements 156 to 238 for additional details of operation particularly pertaining to each of the various elements of the fuel control box.

Operation of the injectors

The injectors of Fig. 24 and the modification shown in Figs. 25 and 26 operate on the same principles in most respects. The form shown in Fig. 24 is preferred for use in the engine shown on account of its smaller shell size. It also has features of internal construction that are preferred. The form shown in Figs. 25 and 26 may be preferred for its tamper proof qualities, and it may be desirable to combine certain features of each.

Fuel is admitted to the injectors from metering pressure passages 241 through check valves 249—249' to the under side of metering pistons 257—257'. The metering springs 258—258' are gaged to deflect accurately predetermined amounts under predetermined loads, so that the lift of each metering piston is exactly in accordance with the metering fuel pressure below it minus the seal fuel pressure above it, which enters from the annular passage 244.

At high engine speeds other factors must be considered, but even at highest speeds the actual injection plus triggering time plus a suitable margin need not exceed 90 degrees of engine shaft rotation, so in a four cycle engine there remains 630 degrees or a minimum of about .020 second available for metering purposes on each cycle, making a relatively slow metering stroke allowable. This may appropriately be termed premetering, since all metering is done before injection starts.

To insure uniform fuel metering in exact accord with the metering pressure over a wide range of operating speeds the resonant frequency of the sprung mass system, comprising the metering spring 258—258' and the masses bearing on this spring, is made as high as possible, and two suitably proportioned factors of hydraulic damping are introduced.

The stiffness of the metering spring in relation to the weight of the metering piston 257—257' and the added effective mass of fuel column moving with this piston is such that if this system were undamped several complete resonant cycles would occur during the allowable lapse of time. It is well known that attainment of such a condition markedly reduces any tendency toward overrun and similarly reduces the damping required to attain completely non-erratic operation at all speeds.

Practically the full metering pressure is available for accelerating the first upward movement of the metering piston which if unchecked would be much too fast. The passages 248—248' are therefore so proportioned as to suitably check the maximum lifting speed of the metering piston. It is desirable to sufficiently check this upstroke speed to insure that a full injection metering stroke would not be more than 30 to 35% completed by the time the piston valve 263—263' completes its upstroke.

The spring which returns the piston valve is proportioned to cause its upstroke to be completed within about 50 degrees of engine rotation under all conditions. The start of this upstroke unseats the weighted check valve 262—262' against the effect of its light spring, permitting fuel to enter from seal fuel passage 244. This largely eliminates any tendency to aid or alter the lift of the metering piston by suction. When the piston valve 263—263' completes its upstroke the check valve 262—262' is closed by momentum and light spring action, trapping excess fuel between it and the top of the metering piston. As the metering piston completes the remaining 65 to 70% of its stroke this excess fuel must be discharged through the restriction of the partly uncovered ports in sleeve 264—264' thus adding another suitably controlled amount of hydraulic damping, effective only on the last part of the metering stroke. This may be so proportioned as to cause this final phase of the upstroke to take up to ten or twelve times as long as the first 30 to 35% of the full upstroke.

The hydraulic principle of damping causes resistance to approach zero as the metering piston approaches zero speed so that resistance to settling in final correct position is eliminated, permitting highest accuracy of metering. The overall damping produced by these two hydraulic damping factors and such other flow and frictional resistances as may exist must be so proportioned as to allow a full metering stroke within 630 degrees rotation at the highest full displacement speed of the engine. This also allows completion of the reduced fuel metering for reduced cylinder displacement when the engine is operating at the predetermined increased speeds which are allowable as the displacement is reduced.

The spring 250–250' which seats the fuel metering check valve is made as light as will insure seating the check in the time available. The slow finishing rates of the fuel metering stroke allow this check valve to approach its seat more and more closely as the metering is being completed, a factor greatly aiding successful operation with a light seating spring. The pressure of this spring causes a fixed added fuel metering pressure to be required to overcome it and this pressure is substantially constant for all metering quantities. Also any initial pressure of the metering spring 258–258' when the metering piston is seated on its shoulder causes a fixed added metering pressure to be required. These two fixed factors add up to a certain fixed metering pressure before any fuel is metered, and this fixed pressure is provided, and adjusted to the fixed initial pressure required by the injectors, by adjustment of the screw 226 at the fuel control box. These fixed pressures cancel each other and leave the actual metering entirely in accord with the volume, pressure and temperature factors.

The orifice passage through valve 262–262' permits fuel to flow upward into the bellows to replace any that may escape therefrom by leakage past piston valve 263—263' or through the bellows air purge tube 269—269' thus permitting the bellows to return to its free length each cycle. Without this orifice passage the bellows might be completely crushed in a few hundred cycles. This passage may serve to aid rather than hinder the hydraulic damping action, since by suitable proportioning a slight amount of excess fuel can be briefly stored in the bellows as the metering piston continues a fairly rapid upstroke, then as the forces acting on the metering piston approach a balance, fuel from the bellows may return through the orifice passage or may unseat valve 262—262' to enter the space below the piston valve and afford additional damping of the last portion of the metering piston stroke.

The seating face of check valve 250—250' and the bottom face of cylinder 247—247' are finely lapped and the only parts of this injection equipment where fluid sealing requirements call for finish comparable in fineness to the finishes and fits commonly required in many places on fuel injection equipment. Even here no ultra precise sizing is required and the parts may be relapped and reused in service, or to pass inspection and tests in manufacture.

The space around and above the bellows is filled with lubricating oil kept free from air or vapors by the separating effects of gravity and the action of port 277—277' at the top of this space which serves to outlet air and admit oil in its place. The bellows completely isolates the fuel from the lubricating oil while permitting transfer of virtually unlimited pressure and many times the used displacement volume without subjecting the bellows to any appreciable pressure difference or any undue flexing or any tendency to set up surge waves in the bellows even at highest operating speeds.

Injection is accomplished by applying force to piston 274—274' to place the oil around the bellows under adequate pressure so that when this pressure is transferred to the fuel it opens the nozzle valve 253—253' against the pressure of the spring 254—254' and the compression pressure inside the cylinder. The surplus of injection pressure over compression pressure is controlled by the proportions of this spring in relation to the effective area of the valve head, while the speed of injection is controlled by the speed at which piston 274—274' is forced downward against the fuel injection pressure.

The first portion of the movement of piston 274—274' does not meet fluid pressure opposition until port 277—277' is closed off, so the force applied thereto is entirely available for acceleration of this piston until the port is closed. Acceleration of the oil above the bellows, the upper portion of the bellows, the fuel within the bellows, and the valves 262—262' and 263—263' then begins, and when the ports in sleeve 264—264' have been closed to the lower groove in the valve 263—263', continued movement builds up pressure in the fuel above the metering piston which is reflected in a corresponding pressure build up at the nozzle. The force applied to the piston 274—274' is such that the process of accelerating, closing off ports, and building up pressure requires less than .001 second at maximum engine speeds, and not a great deal more at low engine speeds.

When pressure has been built up to the required point the nozzle valve 253—253' opens very slightly and the actual injection begins, throwing a disk of very fine spray around the periphery of the nozzle valve. During injection the metering piston is moved downward and since the pressures of the fuel above and below it are substantially equal there is no perceptible leakage through the piston clearance even if quite large compared to usual clearances in high pressure injection equipment. The only place where any leakage (such as to have any measurable effect on the injection of the metered volume) might occur is where the check valve 249—249' seats against the lower face of cylinder 247—247'. These lapped surfaces are free from rotating, sliding, or other rubbing and are closed up by the injection pressure to a clearance or film thickness which is a matter of a few microinches, rather than ten-thousandths, and there is no rubbing such as to cause scoring, wear, or increased leakage.

The seal fuel method of pressure application to the metering piston therefore permits injection of the metered quantity of fuel at very high pressure without perceptible leakage. Another factor tending to completely prevent leakage is the fact that even at engine cranking speeds the nozzle chamber which holds the metered fuel is under injection pressure for only .001 second to .003 second, which of course also insures fine atomization being maintained even at cranking speeds since the entire metered charge is injected in this short period, and at full injection pressure.

When the metered quantity of fuel has been injected the shoulder of the metering piston meets the top face of the metering cylinder 247—247' and the slight extra length of the metering piston slightly unseats check 249—249' to release pressure so that after-dribble is prevented even if leakage past the metering piston should then occur, as the timing of force on the piston 274—274' may be such that the pressure above the metering piston is not released immediately. Leakage above the metering piston has no effect on metering, since excess stroke is available on all the parts above so that full pressure is maintained on the metering piston until it shoulders, regardless of any reasonable leakage, as for example around valve 263—263'.

The operating force may be applied to piston 274—274' by any means capable of applying a suitable force in proper timed relation to the engine, but in this preferred embodiment the piston 274—274' is operated as a pressure multiplier by lubricating oil at an intermediate pressure applied to its upper or large diameter end and admitted and discharged through passages 289 and 290.

Hydraulic timer and distributor

The power for operating the injectors is supplied by lubricating oil at comparatively low pressure brought to the head of the engine from the main oil pump through pipe 80. This pressure is multiplied for application at an intermediate pressure to the injector pistons 274—274' by an accumulator-multiplier 333 which is lifted against spring loading by oil at the lower pressure acting on a relatively large area. This oil is then suddenly released to atmospheric pressure by simultaneous opening of four ports allowing the force of the loading spring 332 to be applied to a relatively small piston operating in the upper end of chamber 444 to suddenly discharge this energy through oil at an intermediate pressure to actuate one of the pistons 274—274'. The discharge of the low pressure oil from under the accumulator-multiplier is assisted by centrifugal force, and in addition to the use of four ports simultaneously opened, the weight of the parts is kept at a minimum, and to this end the spring 332 is made of tubular spring steel material to attain the highest possible ratio of spring pressure to weight.

The flow of oil from pipe 80 into the space under multiplier 333 is of course interrupted during the period of discharge from this space and during this time the oil from pipe 80 is diverted and flows through spaces cored in the cap 330 and depresses accumulator piston 331 against the opposite end of spring 332. This allows steady flow in pipe 80 to avoid surge pressures and later the upstroke of accumulator piston 331 serves to make additional oil available for quick lifting of multiplier 333 during its upstroke.

Light weight of parts 331, 332, and 333 is of extreme importance as is also suitable proportioning of oil passages to allow adequate volume of flow at low maximum velocity to secure accompanying low acceleration and deceleration pressures. This is required to attain high speed operation of multiplier piston 333 which is called upon to operate at full stroke, that is sufficient for a full injection, at frequencies up to 210 cycles per second and also to operate at shorter strokes up to 360 cycles per second.

These requirements of high speed operation furnish one reason for using two-stage fluid pressure multiplication. It has been found that having the entire multiplication done by using a suitably proportioned multiplier in each injector is not satisfactory for high speed operation unless the oil supply pressure is increased to five or more times a desirable figure due to the pressure drop accompanying the oil acceleration in the low pressure passages. If these passages operate under higher pressures, the volumes, speeds, and accelerations are all reduced, so that the oil acceleration pressures become greatly reduced as compared to operating pressures. On the other hand, it is not desirable to attempt all muliplication at the accumulator-multiplier 333, since it is desirable to confine the really high pressures of injection to the injector proper, greatly reducing the effects of leakage at various points between the injector and the timer-distributor assembly, and particularly allowing reasonably free fits for high speed operation of the timer without serious leakage. The two-stage multiplication seems well worth while in consideration of these matters, as without it or the use of a much higher pressure oil-pump supply, operation at the speeds contemplated would not be possible.

Oil placed under pressure in chamber 444 passes into annular chamber 446 and from there communicates with the passages through the contact pieces 308. The ports 305 in distributor ring 306 are evenly spaced, one for each cylinder, and the passages through contact pieces 308 register with ports 305 in proper sequence to distribute oil at intermediate pressure from chamber 444 to the injector-multiplier of the cylinder that is due to fire. Additional details of timer and distributor operation are given in connection with the description of elements 324 to 334 and 437 to 448.

Operation of governor

The speed of the engine is limited by cutting off injection of fuel as the maximum speed allowable is attained. A flyball governor lifts the governor quill 337 and pop quill 335 against the action of springs 336 and 345 in accordance with the engine speed. A displacement modifier 347 is raised as the displacement of the engine is reduced. The rising of the pop quill 335 in relation to modifier 347 controls the cut off of injection so that higher positions of modifier 347 permit the pop quill 335 to reach higher positions, accompanied by higher engine speeds, when the engine displacement is at a reduced value. The cam 34 and the various governor and spring elements involved are so proportioned that the engine speed, as limited by the injection cut off, is in accordance with the permissible or safe operating speed of the engine at the displacement being used.

The cut off of injection causes reduction of engine displacement due to reduced mean working pressure, so that if the engine speed is kept up by the momentum of the load being driven, the injection will be resumed when the engine displacement has been suitably reduced.

When any limiting speed has been reached the pop quill 335 may be raised a suitable amount by utilization of the oil released from chamber 444. The rise may be so proportioned as to prevent resumption of injection until speed or displacement have been very substantially reduced, or may be made very small or virtually nil so that injection may be partially maintained as the engine operates continuously at the limiting speed for the displacement in effect, thereby bringing about a gradual decrease in displacement permitting continued increase in actual engine speed as the displacement is reduced.

The governor action, accompanied by lift or governor quill 337, also serves to advance the timing of the injection by advancing the rotation position of the timing shaft 326 in relation to the governor quill 337 and shaft 30. This is accomplished by helical splines with couple quill 337 to timing shaft 326 so that as quill 337 rises as the engine speed increases the shaft 326 is advanced in relation to shaft 30 to advance the injection an amount suitable to the increased engine speed.

If the engine is to be used to drive an electrical generator or other device requiring constant speed operation under a variable load, the pop quill 335 may be made integral with governor quill 337, and the displacement modifier 347 including its valve and spring, the displacement responsive member 346 and cam 34 may be eliminated. When this is done the ports 449 open into the bottom of chamber 444 when the desired operating speed is reached. This exhausts some or all of the intermediate pressure oil pulses in chamber 444 (depending on how much of ports 449 are still covered) and reduces or completely stops injection, immediately preventing increased speed. However the reduction or elimination of injection causes a reduction in the mean working pressure on the pistons which brings about reduced displacement permitting more efficient operation at reduced power output and the same speed and tending to hold the speed to the required value by balancing the power output to the load without operating with high excess air which causes reduction in thermal efficiency. The engine is then an ideally efficient prime mover for operation of electrical generating plants.

Freedom from torsional critical speeds

Without attempting to closely evaluate the resonant frequencies of such torsional vibration systems as may exist in the mechanism disclosed, it seems evident that the close coupling and freedom from elasticity between the pistons and the flywheel will cause such critical speeds as might be set up by these masses to be very high speeds as compared to the criticals set up by these factors in the usual type of multicylinder engines, in fact probably so high as to be entirely beyond the highest operating speeds of the engine.

Such other torsional vibration systems as may exist in the mechanism seem easily amenable to control by suitable proportioning.

High thermal efficiency

The piston construction shown in Fig. 28, wherein the head sheet of stainless steel or similar alloy is insulated from the body of the piston except around its periphery and a small area at the center, reduces the heat losses in the engine considerably since, by its thinness and also by the low thermal conductivity of alloys of this character, the conduction of heat from the principal areas of this head sheet to the rim and center fastening is greatly reduced as compared to the heat conduction of non-insulated pistons. The convolutions around the rim also lengthen the heat flow path and thereby also reduce the heat conduction, as well as accommodate the thermal expansion occurring in the head sheet at its higher operating temperatures. This higher temperature is beneficial rather than harmful in a compression ignition engine, since even if fuel droplets do not contact the head sheet, its high temperature increases the temperature of the air in which the finely atomized fuel is suspended and the vaporization of the fuel is also aided by radiation of heat therefrom. As the fuel combustion takes place this heat is returned to the head sheet and its operating temperature becomes balanced at a value where the high oxidation resistance of an alloy of the stainless type is required.

The small depression at the center fastening serves to provide additional clearance at the injector nozzle valve which is particularly important when the engine is operating at minimum stroke and low head clearance. The insulating and low heat loss qualities of the piston also become exceptionally useful and valuable when the engine is operating at short stroke, as in such operation the heat loss of an uninsulated piston becomes a much larger proportion of the total heat and thereby becomes a much greater detriment in its effect on efficiency.

The retention of the insulating element in a metallically fused hermetically sealed chamber with bond to the main portion of the piston at the center and rim is believed to present a marked improvement in insulated piston construction, since any insulator is bound to lose its insulating capacity if oil and carbonized oil are allowed to accumulate in and around it by seepage of oil as accelerated by high pressures and temperature changes. While the center bond tends to increase the conduction of a given thickness of head sheet it permits so much reduction of head sheet thickness as to favor considerably the reduction of overall conduction by the head sheet.

The thermal efficiency of the engine is also indirectly aided by the piston construction through the tendency of the high temperature of the head sheet to increase completeness of fuel combustion. Another factor increasing thermal efficiency is the ability of this engine to utilize extra high compression pressures with direct gain in cycle efficiency as well as increased completeness of combustion without losing these gains by increased heat losses, friction, or gas leakage due to the increased pressures, and without failures due to binding and misalignment, brought about by deflections under high operating pressures.

Obviously all the factors discussed under the heading of "Low friction losses" contribute to combining the thermal efficiency into exceptionally high brake thermal efficiency.

Improved cold starting operation

The way the engine always assumes minimum displacement before cranking has been explained, also the extra high compression ratio in effect at this time and the low normal friction losses. It is well known that the saving in friction by use of anti-friction bearings is much greater at very low temperature, so the use of anti-friction bearings at principal full speed bearing points in this engine causes exceptionally marked reduction of low temperature starting drag, accompanied by marked increases in cranking speeds. The leakproof qualities of the piston ring construction and the maintenance of very fine fuel atomization at cranking speeds have also been described. It is apparent that appreciable to marked improvement of each of these factors has been made possible by the constructions disclosed, so that the overall improvement can be expected to give cold starting performance excelling any present standards for either spark or compression ignition engines.

Removable timing assembly

The timing assembly, which carries all timing parts which require assembly in a certain relation that is not insured by the construction of the parts, is mounted on and arranged to be removed with casting 304. This breaks the passages 303 which convey oil at intermediate pressure to the injectors and the passages which carry oil from pistons 411 to pistons 413 for hydraulic valve operation. The casting 304 is fitted into the head casting 396 on a taper of steep enough angle to allow ready disassembly, yet small enough to insure adequate sealing of these passages when pushed into position by moderate pressure from above. When this timing assembly is removed the shaft 326, the lock ring 351, the shaft 318, pop quill 335, displacement modifier 347, and lock ring 350 come out with the timing assembly, leaving the main governor quill 337, displacement responsive member 346, gears 365 and 366 in their normal positions in the main assembly.

With the timing assembly removed the timing gear meshing can be altered or any other desired changes made and the operation of the complete timing assembly accurately check in either service or manufacture by use of suitable checking equipment. When the assembly has passed such checking the one-way meshing of the splines of parts 326 and 318 then assure that when these parts are meshed with their mating splines and one of the seven correct angular positions of casting 304 about its axis is selected by screws 433 and pins 435 the engine will be correctly timed as to injection advance, injection distribution and inlet and exhaust valve action.

Other improved operation factors

Noise of operation should be reduced by the factors promoting quick ignition of the injected fuel. The first fuel injected on any charge seems likely to be ignited before the full injection is completed, which insures against sudden combustion such as generally causes knocking. The hydraulic operation of valves and injectors also favors quiet operation as does the uniform inlet manifold condition for each cylinder which is set up by the even cylinder suction intervals around the manifold chamber 420 with its seven supply passages evenly distributed around the circumference.

The unusually compact construction favors noise reduction by reduced area and elimination of flat outer surfaces tending to project noise in any one direction. The compactness also (and more importantly) contributes to low weight even with adequate strength and rigidity for high presure operation. In quantity production or in large engines this weight saving should more than compensate for the somewhat increased number of parts involved.

The compression ignition operation permits much reduced fire hazard by allowing satisfactory operation with low volatility fuels and thus makes placing the fuel tank adjacent to the engine quite permissible, with added convenience and economies. The unusual combination of provisions aiding complete combustion of the fuel tends to eliminate smoke and odors and to reduce oil dilution. In fact, the complete isolation of fuel and oil in the injection system should, in combination with the completenes of combustion, eliminate any noticeable tendency toward oil dilution.

With the engine idling being done at reduced displacement, the idling speed may be two to three times as high as in the usual engine with the idling fuel consumption still held less than usual. This results in good cooling while idling, and maintenance of generator charging in idling without having the generator, fan, or water pump run at undue speeds even when the engine is overspeeded at reduced displacement and also resulting in longer life and quieter operation of these accessories in the more normal full displacement and near full displacement operating conditions.

The fuel economy made available by variable displacement is quite a considerable factor, as internal combustion engines are notoriously inefficient when operating at very low load factors, a condition persisting over a great part of the operating time of many engines, particularly in road vehicles. The compression ignition engine by its ability to attain fairly complete combustion at very low fuel/air ratios gives considerably better performance in this respect, but the excess air still causes considerable loss of efficiency. The variable displacement feature permits the lower fuel injection without having air in excess of the practical optimum ratio, thus making a notable further improvement in efficiency.

Having shown and described one or more specific embodiments of preferred form of this invention, the spirit and scope of my invention is defined in the following claims.

I claim:

1. In an internal combustion engine, means for pumping liquid fuel, means for regulating the pressure of the fuel pumped, and injector means comprising a pressure-expansible metering chamber, a duct connecting said pumping means with said metering chamber, a check valve member closing said duct against back flow, an atomizing fuel nozzle communicating with said metering chamber, and means for suddenly contracting said metering chamber to forcibly expel the metered quantity of fuel through said atomizing fuel nozzle.

2. In a multi-cylinder internal combustion engine, a fuel pump, means for controlling the output pressure of said pump, an injector for each cylinder of said engine, a fluid passage from said pump to each injector and, in each injector, means for metering fuel in quantity governed by said output pressure and storing the metered quantity of fuel during the time intervals between injections, check valve means for preventing back flow of fuel from said metering means into said passages, a fuel nozzle allowing outward passage of fuel from said metering chamber through said nozzle when high pressure is applied, and means for suddenly expelling said metered quantity of fuel at high pressure through said nozzle in timed relation to the operation of said engine.

3. In an internal combustion engine, means for pumping fuel to a regulated pressure, a supply passage conveying fuel at said pressure, a discharge chamber, atomizing discharge means for said chamber, a metering piston having one end exposed to fuel in said discharge chamber, stop means for said piston limiting its entry into said discharge chamber, a port admitting fuel from said supply passage to said discharge chamber, a check valve closing against back flow through said port, metering spring means urging said metering piston toward said stop means, an auxiliary fuel chamber to which one end of said metering piston is exposed, supply means for keeping said auxiliary chamber filled with fuel at a lower pressure than aforesaid regulated pressure, valve means for intermittently closing said auxiliary chamber against back flow into said supply means, a flexible membraneous member having one side exposed to said auxiliary chamber, and means for intermittently applying high pressure of a different fluid to the other side of said membraneous member to transfer high pressure to fuel in said auxiliary chamber to force discharge of fuel from said discharge chamber through said atomizing discharge means until said metering piston is forced against said stop means.

4. In an internal combustion engine, a fuel pump, an inlet and a discharge passage for the said pump, means for regulating the pressure in the said discharge passage, a fuel discharge chamber, atomizing discharge means for said chamber, a metering piston having one end exposed to fuel in said discharge chamber, stop means for said piston limiting its entry into said discharge chamber, a port admitting fuel from aforesaid pump discharge passage to said discharge chamber, a check valve closing against back flow through said port, metering spring means urging said metering piston toward said stop means, and means for applying additional force to move said metering piston toward said stop means to suddenly eject fuel from said discharge chamber through said atomizing discharge means in quantity controlled by the presetting of said metering piston under the influence of said metering spring means and the pressure of fuel in said discharge chamber due to fuel entering from said port during time intervals between injection actions.

5. The apparatus defined in claim 4, wherein said engine is of variable displacement, and said means for regulating the pressure in said discharge passage includes manually operable means for regulating said pressure, with means for limiting said pressure to a predetermined maximum value at maximum engine displacement, and for limiting said pressure to a lower value when engine displacement is reduced.

6. In a fuel injection internal combustion engine having fuel metering injectors wherein the fuel metered per injection is varied by varying the pressure of fuel in a duct supplying said injectors, and wherein a certain minimum pressure can be carried when zero injection is required, means for controlling the injection quantity comprising a fuel supply source at a pressure exceeding that required for maximum injection, a pressure control valve connected to said source and maintaining a pressure in said duct in proportion to the force applied to said valve, manual means for adjusting the force applied to said valve to maintain the maximum pressure in said duct that can be carried at zero injection, and separate means for controlling additional force applied to said valve to control injection quantity.

7. In an internal combustion engine, means for pumping fuel to a regulated pressure, an injector supply passage conveying fuel at said pressure, an auxiliary passage, means for admitting and exhausting fuel to hold a lesser pressure in said auxiliary passage in controlled relation to said regulated pressure, and an injector comprising a nozzle chamber, atomizing discharge means for said chamber, a metering piston having one end exposed to said nozzle chamber, stop means for said piston limiting its entry into said nozzle chamber, a port admitting fuel from said injector supply passage into said nozzle chamber, a check valve closing against back flow of said fuel, a metering spring urging said metering piston toward said stop means, an auxiliary fuel chamber to which one end of said metering piston is exposed, a port communicating from said auxiliary passage to said auxiliary chamber, and means for closing said port and applying high pressure to the fuel in the said auxiliary chamber to move said metering piston toward its stop to eject fuel from said nozzle chamber through said atomizing means, in quantity controlled by the pre-setting of said metering piston under the influence of fuel pressure in said nozzle chamber as opposed by said metering spring and fuel pressure in said auxiliary chamber.

8. In an internal combustion engine, means for pumping fuel to a controllable pressure, an injector supply passage conveying fuel at said pressure, an auxiliary fuel passage, means for admitting and exhausting fuel to hold a lower pressure in said auxiliary passage, and an injector comprising a nozzle chamber, atomizing discharge means for said chamber, a metering piston having one end exposed to said nozzle chamber, stop means for said metering piston limiting its entry into said nozzle chamber, a port admitting fuel from said injector supply passage into said nozzle chamber, a check valve closing said port against back flow of said fuel, a metering spring urging said metering piston toward said stop means, an auxiliary fuel chamber to which one end of said metering piston is exposed, an auxiliary port communicating from said auxiliary passage to said auxiliary chamber, a piston valve having one end exposed to said auxiliary chamber and positioned to cover said auxiliary port when moved slightly into said auxiliary chamber, means for forcing said piston valve into said auxiliary chamber until the fuel trapped therein forces said metering piston against said stop means, separate stop means for limiting the return stroke of said piston valve, and spring means for returning said piston valve to its stop position.

9. In an internal combustion engine, means for pumping liquid fuel, means for regulating the pressure of the fuel pumped, and injector means comprising a pressure expansible metering chamber, a duct connecting said pumping means with said metering chamber, a check valve closing said duct against back flow, an atomizing fuel discharge nozzle, a fuel passage from said metering chamber to said nozzle, and means for forcibly contracting said metering chamber to expel the metered quantity of fuel through said discharge nozzle and for opening said check valve when the metered quantity of fuel has been expelled.

10. In a fuel injection internal combustion engine having fuel injectors each comprising an expansible lubricant chamber and an expansible fuel chamber, sockets for said injectors in the engine framework, an annular fuel port and an annular lubricant port formed between each of said injectors and its socket, fluid sealing means for each of said annular ports, fuel supply passages in said engine framework inter-connecting said fuel ports, a fuel supply source connected to said supply passage, independent lubricant passages to each of said lubricant ports through said engine framework and means for extracting, inserting and locking said injectors in position in said engine framework.

11. In a fuel injection engine, an engine driven lubricant pump, an elastically loaded accumulator storing lubricant under pressure from said pump, a fuel pump, means for controlling the pressure of fuel pumped, an injector having separate expansible chambers for fuel and lubricant, means for variably expanding said fuel chamber by fuel under controlled pressure to pre-meter the quantity of fuel to be injected, and engine driven valve means for intermittently connecting said accumulator to said lubricant chamber of said injector to expand same to contract said fuel chamber to eject fuel therefrom.

12. In a fuel injection internal combustion engine having a plurality of fuel metering injectors wherein metering is controlled by pressure of fuel in a duct supplying said injectors and timing of said injectors is controlled by timing of lubricant pulses delivered to lubricant chambers of said injectors, a constant pressure lubricant supply source, an accumulator holding a reserve of lubricant under pressure and engine driven valve means for distributing lubricant pulses from said accumulator to said injectors in sequence.

13. In an internal combustion engine, an oil pump, an output pressure regulating means for said pump, a duct conveying pressure so regulated, a valve connected to said duct, a discharge passage to said valve, a pulse passage to said valve, means for operating said valve to cause said pulse passage to be alternately connected to said duct and said discharge passage, and a fuel pump operated by the oil pulses created in said pulse passage.

14. In a fuel injection internal combustion engine having fuel metering injectors wherein the fuel metered per injection is controlled by the difference in pressure between a principal fuel metering duct and an auxiliary fuel duct containing fuel at a lower pressure, means for controlling the pressure difference between the two said ducts comprising a piston valve with one end exposed to said principal duct pressure and the other end exposed to said auxiliary duct pressure and having a stem to which a force can be applied, means for applying a variable force to said stem to control the pressure difference in said ducts, a cylinder in which said piston valve operates, and ports in said valve and cylinder which provide a connecting passage between the two said ducts when said piston valve is moved when the force applied to said piston valve by the pressure difference in said two ducts exceeds the force applied to said stem.

15. In a fuel injection internal combustion engine having fuel metering injectors wherein the fuel metered per injection is controlled by the difference in pressure between a principal fuel metering pressure duct system and an auxiliary fuel duct system containing fuel at a lower pressure, means for controlling the pressure difference between said two fuel duct systems comprising a piston valve with one end exposed to the principal duct pressure and other end exposed to the auxiliary duct pressure and to the influence of an additional force to control the fuel metered per injection by variation of the said force, a fuel pressure supply source, and ports in said valve positioned to increase the fuel pressure in said principal duct system when said force exceeds the difference in force applied to the said piston valve by the pressure difference in said two duct systems.

16. In an internal combustion engine, an engine driven lubricant pump, output pressure regulating means for said pump, a two chamber spring loaded accumulator storing lubricant under pressure from said pump in a larger chamber and having a smaller chamber kept filled with lubricant, timed valve means for intermittently releasing the lubricant from said larger chamber causing lubricant to be expelled from said smaller chamber under multiplied pressure, an injector having means for injecting a measured quantity of fuel when actuated by fluid under pressure, and means connecting the said smaller chamber to said injector to apply lubricant at said multiplied pressure to actuate said injector means.

17. In a compression ignition engine, a fuel injector, a fuel chamber therein, means for expelling fuel from said chamber by contraction of same, a lubricant chamber expansible by lubricant under pressure and arranged to contract said fuel chamber when expanded, a source of lubricant under pressure, engine driven valve means for timed admittance of lubricant from said source to said lubricant chamber, and speed responsive means for advancing the timing of said valve means as the engine operating speed is increased.

18. In an internal combustion engine, a fuel injector comprising a discharge nozzle, a fuel chamber for metering and storing each charge of fuel, an expansible lubricant chamber for expelling the metered quantity of fuel through said discharge nozzle when lubricant under high pressure is supplied to said expansible lubricant chamber, a high pressure lubricant supply source, engine driven valve means for timed admission of lubricant from said source to said lubricant chamber, and speed responsive means for advancing the timing of said valve means as engine operating speed is increased.

19. In a compression ignition internal combustion engine having fuel injectors actuated by a lubricant pumping system and timed by engine driven valve means controlling the delivery of lubricant to actuate said fuel injectors, the combination of speed responsive means for advancing the timing of said valve means as the engine operating speed is increased and equal length lubricant ducts from said valve means to each of said injectors.

20. In a compression ignition internal combustion engine having fuel injectors actuated by a lubricant pumping system, the combination of a governor, a timer controlled by said governor to advance timing of lubricant delivery power pulses to said injectors as engine speed is increased, and valve means also controlled by said governor to cut off delivery of lubricant power pulses to said injectors when the engine reaches a predetermined speed.

21. In a fuel injection internal combustion engine having fuel metering injectors wherein metering is controlled by the pressure of fuel in a duct supplying the injectors, fuel pressure control means comprising a chamber maintained at inlet manifold pressure, a sealed expansible member mounted in said chamber, a lever rocked by expansion of said sealed member, means for exerting a governed force at the end of an arm of said lever, a rocker arm having an arcuate face to which said force is applied at reduced lever arm as said manifold pressure is reduced, and a fuel pressure controlling valve controlling pressure in said supply duct and governed by means actuated by said rocker arm.

22. The structure defined in claim 21, wherein said means actuated by said rocker arm comprises a rocking strut member, and a thermally responsive element arranged to rock said strut member toward the pivot center of said rocker arm as the temperature of said thermally responsive element is lowered.

23. In an internal combustion engine having fuel injectors actuated by lubricant delivered under pressure, a constant pressure lubricant supply source, an accumulator holding a reserve of lubricant under pressure, engine driven valve means for intermittently delivering lubricant pulses to said injectors in sequence from said accumulator, valve means operable to bypass lubricant from said source and accumulator to cut off power pulses to said injectors, and a governor controlling said valve means to cut off power pulses to said injectors when a predetermined engine speed is reached.

24. In a variable displacement internal combustion engine having fuel metering injectors wherein fuel metering is controlled by the pressure of fuel in a duct supplying the injectors, fuel pressure control means comprising a chamber, an air passage connecting said chamber to the inlet manifold of said engine, a sealed expansible member mounted in said chamber, a lever rocked by expansion of said sealed member, means for exerting a governed force at the end of an arm of said lever, a rocker arm having an arcuate face to which said force is applied at reduced lever arm as said sealed member is expanded by reduced manifold pressure, a valve controlling the fuel pressure in said duct and governed by means actuated by said rocker arm, and means controlled by the displacement of said engine for governing said force.

25. In a fuel injection internal combustion engine having fuel metering injectors wherein fuel metered per injection is varied by varying the pressure of fuel in a duct supplying said injectors, a fuel supply source at pressure exceeding the maximum fuel pressure to be used in said duct, a pressure control valve maintaining a pressure in said duct governed by the force applied to said pressure control valve, a rocker arm, manually controllable means for applying a variable force to said rocker arm, a lever, a movable fulcrum for said lever, an arcuate surface on said rocker arm concentric with the normal position of said fulcrum, a thermally responsive element fixed to swing one end of said lever across said arcuate surface toward the pivot center of said rocker arm as the temperature of said thermally responsive element is lowered and means for applying the force placed on the end of said lever by said rocker arm to said pressure control valve.

26. In a variable displacement fuel injection engine, means for injecting into a cylinder of said engine a controllable quantity of fuel per injection, manually operable means for controlling aforesaid quantity, and means for limiting the range of said manually operable means to a predetermined maximum quantity at maximum engine displacement and to a reduced maximum quantity when engine displacement is reduced.

27. In a variable displacement fuel injection engine, means for controlling the displacement of said engine comprising an expansible fluid chamber reducing engine displacement as said chamber is expanded, means for feeding fluid to said chamber under pressure, valve means controlled by the fluid pressure in said chamber for outleting fluid from said chamber when said pressure exceeds a predetermined value, means for injecting a controllable quantity of fuel per injection into a cylinder of said engine, manually operable means for controlling said quantity, and means for limiting the range of said manually operable means to a predetermined maximum quantity at maximum engine displacement and to a reduced maximum quantity when engine displacement is reduced.

*28. In a liquid metering and forcing mechanism, a metering chamber variably expansible under pressure, a liquid supply duct feeding liquid to said chamber at a controlled pressure, varied to govern the extent of expansion of said metering chamber, a check valve closing against back flow from said metering chamber into said duct, a discharge outlet passage adapted to accept liquid at a higher pressure than said controlled pressure, means for forcibly contracting said metering chamber, actuating means for cyclic actuation of said contracting means, a shaft driving said actuating means, and means responsive to the speed of said shaft for advancing the timing of said actuating means in respect to the rotated position of said shaft as the speed of said shaft is increased.*

*29. In a fuel injection engine, an engine driven lubri-*

*cant pump, an accumulator storing lubricant under pressure from said pump, means for supplying fuel at low pressure, an injector having separate expansible chambers for fuel and lubricant, means for permitting expansion of said fuel chamber to admit the quantity of fuel to be injected and for subsequently restricting the expansion and the fuel admitted to said fuel chamber, and engine driven valve means for intermittently connecting said accumulator to said lubricant chamber of said injector to expand same to contract said fuel chamber to eject the metered quantity of fuel therefrom.*

*30. In a liquid metering device, a principal liquid metering pressure duct system, an auxiliary duct system containing liquid at a lower pressure than that in the principal duct system, means for controlling the pressure difference between said two duct systems comprising a piston valve with one end exposed to the principal duct pressure and the other end exposed to the auxiliary duct pressure and to the influence of an additional controlling force, a liquid pressure supply source at a higher pressure than said principal duct system pressure, ports in said valve positioned to increase liquid pressure in said principal duct system when said controlling force exceeds the force applied to the said piston valve by the said difference in pressure, and means for cyclically utilizing said pressure difference to repeatedly meter a volume of liquid governed by the amplitude of said controlling force.*

*31. In a fuel injection engine; an engine driven lubricant pump; means governing the output pressure of said pump; an injector having separate expansible chambers for fuel and lubricant, means for supplying fuel to the fuel chamber in the injector at a relatively low pressure, means for permitting expansion of said fuel chamber to admit a primary quantity of fuel and for subsequently restricting the expansion to retard the final fuel admitted to said chamber, and engine driven valve means for intermittently connecting the output of said lubricant pump to said lubricant chamber to contract said fuel chamber to eject fuel therefrom.*

References Cited in the file of this patent or the original patent

UNITED STATES PATENTS

| | | |
|---|---|---|
| Re. 18,595 | Wilson | Sept. 13, 1932 |
| 1,005,457 | Oberhansli | Oct. 10, 1911 |
| 1,042,018 | Macomber | Oct. 22, 1912 |
| 1,170,200 | Ver Planck | Feb. 1, 1916 |
| 1,255,973 | Almen | Feb. 12, 1918 |
| 1,314,561 | Wright | Sept. 2, 1919 |
| 1,315,538 | Burtnett | Sept. 9, 1919 |
| 1,345,614 | Manker | July 6, 1920 |
| 1,346,672 | Patton | July 13, 1920 |
| 1,375,140 | Fasey | Apr. 19, 1921 |
| 1,379,774 | Murphy | May 31, 1921 |
| 1,394,811 | Daloz | Oct. 25, 1921 |
| 1,612,925 | Ingoldby | Jan. 4, 1927 |
| 1,617,736 | Arnold | Feb. 15, 1927 |
| 1,623,049 | Dorsey | Apr. 5, 1927 |
| 1,692,845 | Kolb | Nov. 27, 1928 |
| 1,696,984 | Trbojevich | Jan. 1, 1929 |
| 1,701,389 | Ricardo | Feb. 5, 1929 |
| 1,746,335 | Boyce | Feb. 11, 1930 |
| 1,747,578 | Davidson et al. | Feb. 18, 1930 |
| 1,819,715 | Le Bret | Aug. 18, 1931 |
| 1,828,676 | Morton | Oct. 20, 1931 |
| 1,853,767 | Kent | Apr. 12, 1932 |
| 1,919,755 | Sherman | July 25, 1933 |
| 1,936,853 | Ofeldt | Nov. 28, 1933 |
| 1,941,766 | Thom | Jan. 2, 1934 |
| 1,948,827 | Redrup | Feb. 27, 1934 |
| 1,956,355 | Junkers | Apr. 24, 1934 |
| 1,956,612 | Brun | May 1, 1934 |
| 1,968,470 | Szombathy | July 31, 1934 |
| 1,981,913 | Fielden | Nov. 27, 1934 |
| 1,994,223 | Leveque | Mar. 12, 1935 |
| 1,996,330 | Goshaw | Apr. 2, 1935 |
| 2,015,887 | Eek | Oct. 1, 1935 |
| 2,019,650 | Bischof | Nov. 5, 1935 |
| 2,021,590 | Coombs | Nov. 19, 1935 |
| 2,027,360 | Alden | Jan. 14, 1936 |
| 2,046,491 | Scott | July 7, 1936 |
| 2,052,737 | Zubaty | Sept. 1, 1936 |
| 2,056,204 | Noack | Oct. 6, 1936 |
| 2,135,925 | Tuscher | Nov. 8, 1938 |
| 2,136,959 | Winfield | Nov. 15, 1938 |
| 2,146,139 | Greene | Feb. 7, 1939 |
| 2,152,811 | Michell | Apr. 4, 1939 |
| 2,227,736 | Olson | Jan. 7, 1941 |
| 2,263,561 | Biermann | Nov. 25, 1941 |
| 2,344,058 | Pescara | Mar. 14, 1944 |
| 2,347,363 | Palumbo | Apr. 25, 1944 |
| 2,373,735 | Alexander | Apr. 17, 1945 |
| 2,375,906 | Falcon | May 15, 1945 |
| 2,391,221 | Beeh | Dec. 18, 1945 |
| 2,421,475 | Beeh | June 3, 1947 |
| 2,467,413 | Wildhack | Apr. 19, 1949 |
| 2,559,364 | Mashinter | July 3, 1951 |
| 2,571,501 | Truxell | Oct. 16, 1951 |
| 2,621,640 | Reggio | Dec. 16, 1952 |

FOREIGN PATENTS

| | | |
|---|---|---|
| 23,823 | Great Britain | Oct. 18, 1909 |
| 252,225 | Great Britain | May 6, 1926 |
| 739,000 | France | Oct. 24, 1932 |
| 813,503 | France | Feb. 22, 1937 |